(12) United States Patent
Freedman

(10) Patent No.: US 7,739,410 B2
(45) Date of Patent: Jun. 15, 2010

(54) SYNCHRONIZATION METHODS AND SYSTEMS

(75) Inventor: Gordon J. Freedman, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 602 days.

(21) Appl. No.: 11/650,726

(22) Filed: Jan. 7, 2007

(65) Prior Publication Data

US 2008/0168292 A1 Jul. 10, 2008

(51) Int. Cl.
G06F 15/16 (2006.01)

(52) U.S. Cl. .................. 709/248; 709/246; 709/203; 709/232

(58) Field of Classification Search .................. 709/248
See application file for complete search history.

(56) References Cited

U.S. PATENT DOCUMENTS

| | | | |
|---|---|---|---|
| 5,974,238 A | | 10/1999 | Chase, Jr. |
| 6,023,708 A | * | 2/2000 | Mendez et al. ............. 707/203 |
| 6,034,621 A | * | 3/2000 | Kaufman ................... 340/7.21 |
| 6,108,687 A | * | 8/2000 | Craig ......................... 709/203 |
| 6,178,403 B1 | | 1/2001 | Detlef |
| 6,269,405 B1 | | 7/2001 | Dutcher et al. |
| 6,295,541 B1 | * | 9/2001 | Bodnar et al. ............. 707/203 |
| 6,336,124 B1 | * | 1/2002 | Alam et al. ................. 715/205 |
| 6,393,434 B1 | | 5/2002 | Huang et al. |
| 6,393,462 B1 | * | 5/2002 | Mullen-Schultz ........... 709/206 |
| 6,430,576 B1 | | 8/2002 | Gates et al. |
| 6,557,028 B2 | * | 4/2003 | Cragun ....................... 709/205 |
| 6,564,261 B1 | | 5/2003 | Gudjonsson et al. |
| 6,571,245 B2 | * | 5/2003 | Huang et al. .................. 707/10 |
| 6,654,785 B1 | * | 11/2003 | Craig ......................... 709/203 |
| 6,708,221 B1 | * | 3/2004 | Mendez et al. ............. 709/248 |
| 6,721,871 B2 | * | 4/2004 | Piispanen et al. ............. 712/1 |
| 6,789,258 B1 | | 9/2004 | Zak, Jr. et al. |
| 6,907,450 B1 | * | 6/2005 | Lautenbacher ............. 709/204 |
| 6,985,912 B2 | | 1/2006 | Mullins et al. |
| 6,990,513 B2 | | 1/2006 | Belfiore et al. |
| 7,039,679 B2 | * | 5/2006 | Mendez et al. ............. 709/248 |
| 7,096,867 B2 | | 8/2006 | Smith et al. |

(Continued)

FOREIGN PATENT DOCUMENTS

WO WO-03/073292 9/2003

(Continued)

OTHER PUBLICATIONS

Google Browser Sync by Google Labs, obtained from the Internet at: http://web.archive.org/web/20060613024119.*

(Continued)

*Primary Examiner*—Kamal B Divecha
(74) *Attorney, Agent, or Firm*—Blakely, Sokoloff, Taylor & Zafman LLP

(57) ABSTRACT

Bookmark synchronization methods, systems and computer readable media are described. One exemplary method includes storing a mapping relationship between a first topology for bookmarks of a first web browser on a host and at least one of an intermediate topology and a device topology for bookmarks of a second web browser on a device and storing a mapping relationship between the device topology and at least one of the intermediate topology and the first topology, and synchronizing bookmarks on the device with bookmarks on the host. Systems, computer readable media and other methods are also described.

25 Claims, 28 Drawing Sheets

U.S. PATENT DOCUMENTS

| | | | |
|---|---|---|---|
| 7,100,039 | B2 | 8/2006 | Fisher et al. |
| 7,188,193 | B1 | 3/2007 | Getsin et al. |
| 7,200,668 | B2 * | 4/2007 | Mak et al. ............... 709/230 |
| 7,263,551 | B2 | 8/2007 | Belfiore et al. |
| 7,401,104 | B2 * | 7/2008 | Shah et al. .............. 707/204 |
| 7,454,462 | B2 | 11/2008 | Belfiore et al. |
| 7,458,091 | B1 | 11/2008 | Getsin et al. |
| 7,478,170 | B2 * | 1/2009 | Ong et al. ............... 709/246 |
| 7,523,096 | B2 * | 4/2009 | Badros et al. ............... 707/3 |
| 7,523,386 | B2 * | 4/2009 | Awada et al. ............ 715/200 |
| 7,580,946 | B2 | 8/2009 | Mansour et al. |
| 2002/0087632 | A1 | 7/2002 | Keskar |
| 2002/0116405 | A1 | 8/2002 | Bodnar et al. |
| 2002/0123325 | A1 | 9/2002 | Cooper |
| 2002/0124241 | A1 | 9/2002 | Grey et al. |
| 2003/0095096 | A1 | 5/2003 | Robbin et al. |
| 2003/0126301 | A1 | 7/2003 | Mason et al. |
| 2004/0054711 | A1 | 3/2004 | Multer |
| 2004/0054739 | A1 | 3/2004 | Friend et al. |
| 2004/0093342 | A1 * | 5/2004 | Arbo et al. ............... 707/102 |
| 2004/0139178 | A1 | 7/2004 | Mendez et al. |
| 2004/0148375 | A1 | 7/2004 | Levett et al. |
| 2004/0181580 | A1 | 9/2004 | Baranshamaje |
| 2004/0186916 | A1 | 9/2004 | Bjorner |
| 2004/0224638 | A1 | 11/2004 | Fadell et al. |
| 2004/0225731 | A1 | 11/2004 | Piispanen et al. |
| 2004/0225791 | A1 * | 11/2004 | Keskar et al. ............. 710/300 |
| 2005/0125459 | A1 | 6/2005 | Sutinen et al. |
| 2005/0147130 | A1 | 7/2005 | Hurwitz et al. |
| 2005/0268307 | A1 | 12/2005 | Gates et al. |
| 2006/0005191 | A1 | 1/2006 | Boehm |
| 2006/0015818 | A1 | 1/2006 | Chaudhri et al. |
| 2006/0059207 | A1 | 3/2006 | Hirsch et al. |
| 2006/0101082 | A1 | 5/2006 | Agrawal et al. |
| 2006/0248162 | A1 | 11/2006 | Kawasaki |
| 2006/0264206 | A1 | 11/2006 | Taba et al. |
| 2007/0022155 | A1 | 1/2007 | Owens et al. |
| 2007/0075965 | A1 | 4/2007 | Huppi et al. |
| 2007/0118570 | A1 | 5/2007 | Wang |
| 2007/0124331 | A1 * | 5/2007 | Griffin .................... 707/104.1 |
| 2007/0203955 | A1 * | 8/2007 | Pomerantz ............... 707/201 |
| 2007/0271317 | A1 | 11/2007 | Carmel |
| 2007/0271505 | A1 * | 11/2007 | Dandekar et al. ........... 715/513 |
| 2008/0010286 | A1 * | 1/2008 | Zhang et al. ................. 707/10 |
| 2008/0033950 | A1 | 2/2008 | Lemay et al. |
| 2008/0163743 | A1 * | 7/2008 | Freedman ................... 84/609 |
| 2008/0168072 | A1 * | 7/2008 | Freedman ................... 707/100 |
| 2008/0168106 | A1 * | 7/2008 | Freedman ................... 707/201 |
| 2008/0168126 | A1 * | 7/2008 | Freedman ................... 709/202 |
| 2008/0168184 | A1 * | 7/2008 | Freedman et al. ........... 709/248 |
| 2008/0168291 | A1 * | 7/2008 | Freedman ................... 713/375 |

FOREIGN PATENT DOCUMENTS

| | | |
|---|---|---|
| WO | WO-03/088613 | 10/2003 |
| WO | WO 2008/085869 | 7/2008 |
| WO | WO 2009/023040 | 2/2009 |

OTHER PUBLICATIONS

Google browser Sync dates obtained from http://web.archive.org.*
Sync2it—Basic Concepts, obtained from the Internet at: http://www.sync2it.com/help/howitworks.html.*
Sync2it dates obtained from the Internet at: http://web.archive.org.*
SyncML, "Building an Industry-Wide Mobile Data Synchronization Protocol", SyncML White Paper, Version 1.0, Jan. 2001, 14 pages.
Office Action for U.S. Appl. No. 11/650,624 mailed Dec. 5, 2008, Whole Document.
International Search Report & Written Opinion for PCT Application No. PCT/US2008/000087 mailed Jan. 30, 2009.
Novik, Lev et al.: Peer-to-Peer Replication in WinFS research. microsoft.com/pub/tr/TR-2006-78 Jun. 2006, 17 pages.
Shalev, Ori et al.: Predictive Log-Synchronization ACM SIGOPS Operating Systems Review, vol. 40, Issue 4, Oct. 2006, pp. 305-315.
International Search Report & Written Opinion for PCT Application No. PCT/US2008/000062 mailed Mar. 12, 2009, Whole document.
Office Action for U.S. Appl. No. 11/650,730 mailed Mar. 31, 2009, Whole document.
Office Action for U.S. Appl. No. 11/650,732 mailed Apr. 3, 2009, Whole document.
Office Action for U.S. Appl. No. 11/650,729 mailed Apr. 28, 2009, Whole document.
Jonsson, Andreas , et al., "SyncML—getting the mobile Internet in sync", *Ericsson Review*, No. 3; XP-002958500, (2001), 110-115.
Lockhart, Robert K., et al., "Specifications for Ir Mobile Communications (IfMC)", Version 1.1; XP-002155443; Jan. 1, 1999, 29-44.

* cited by examiner

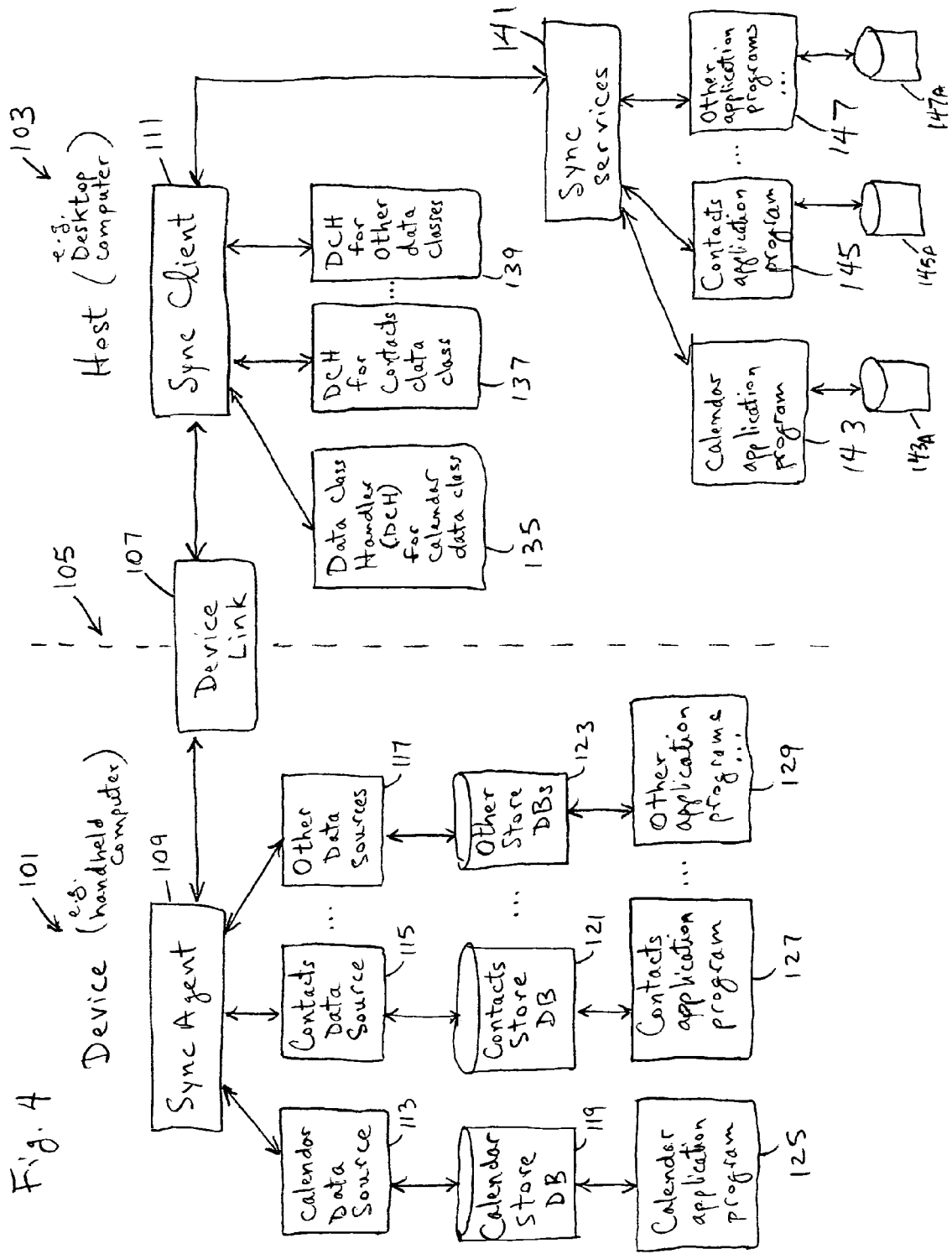

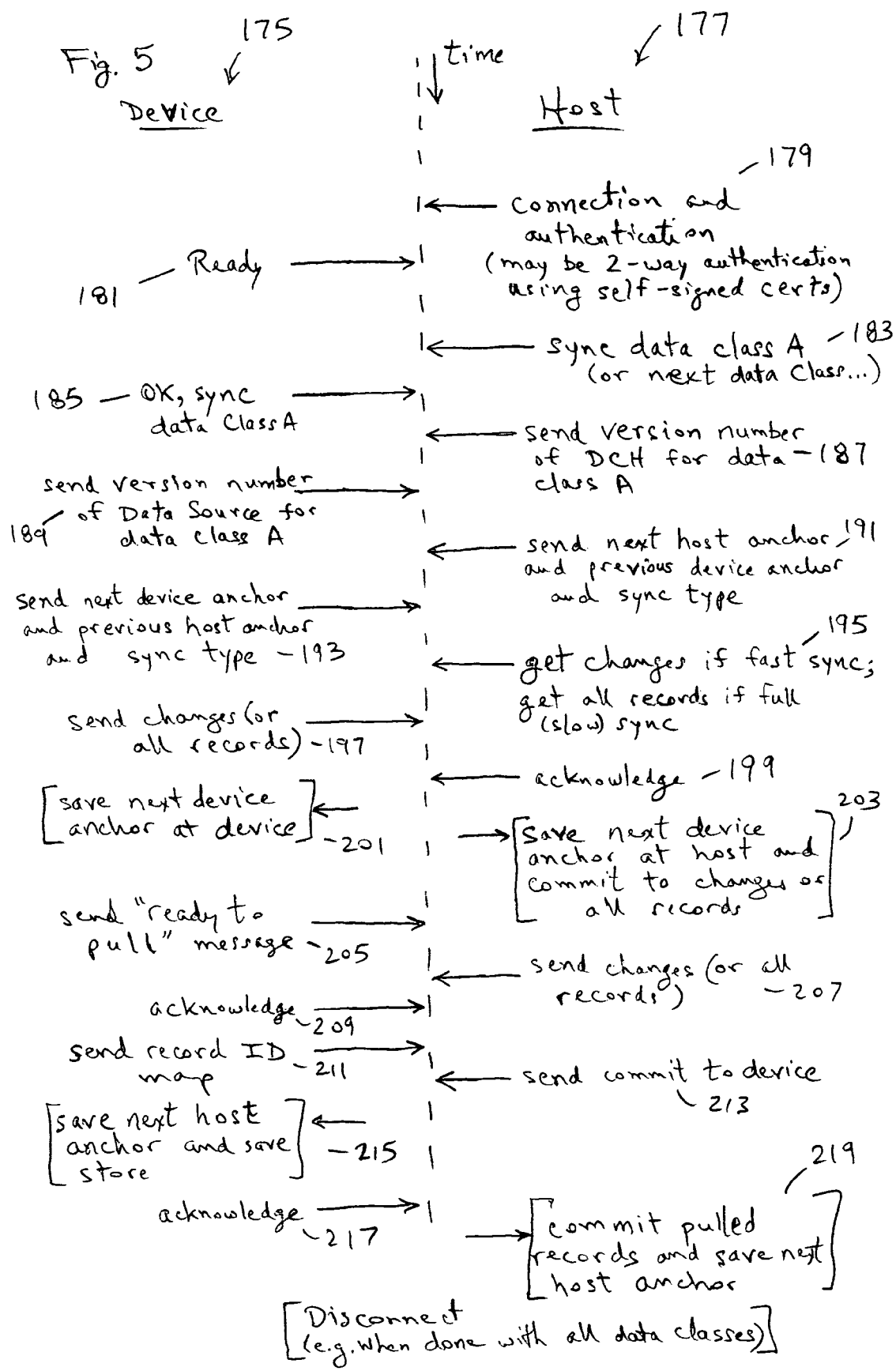

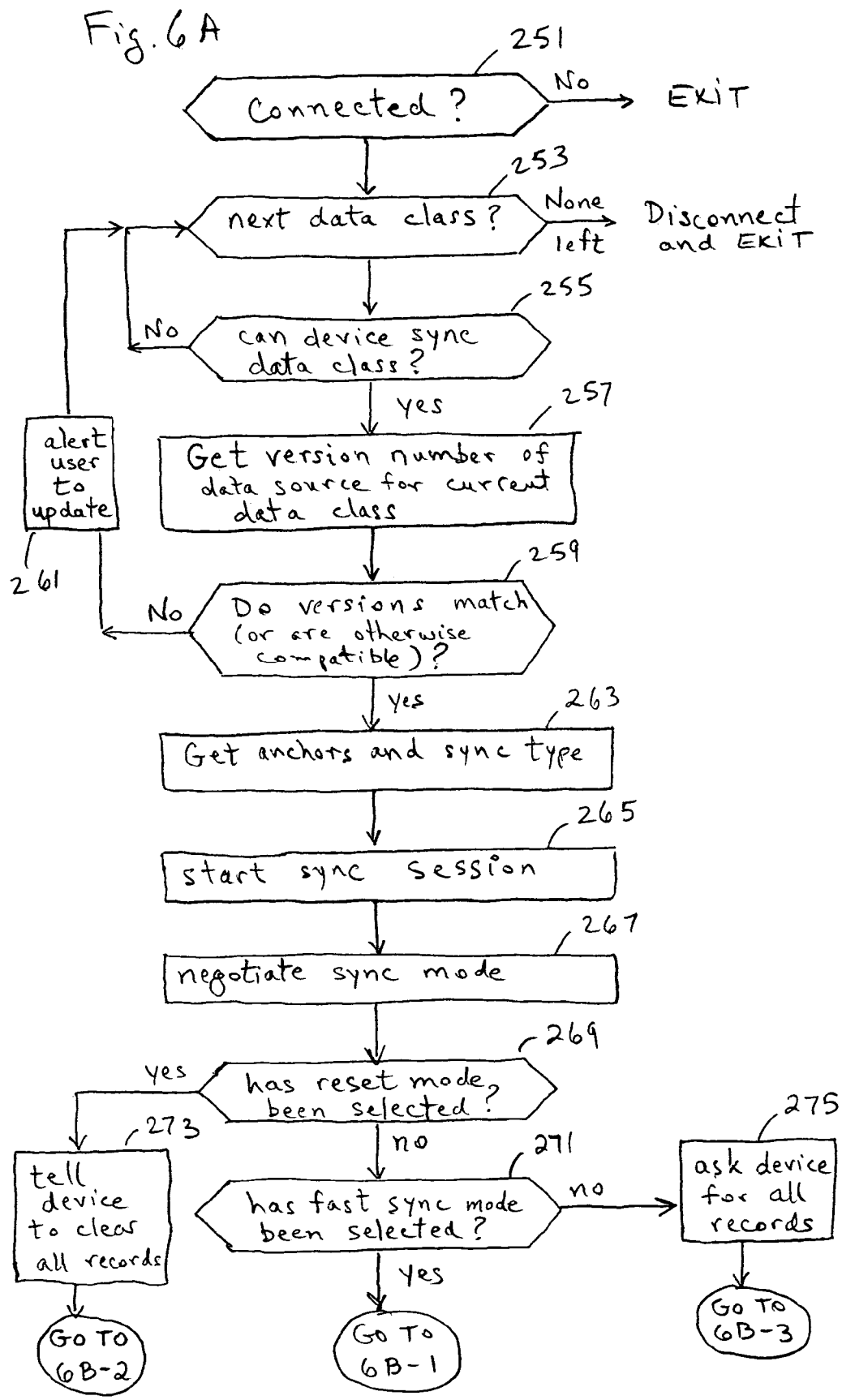

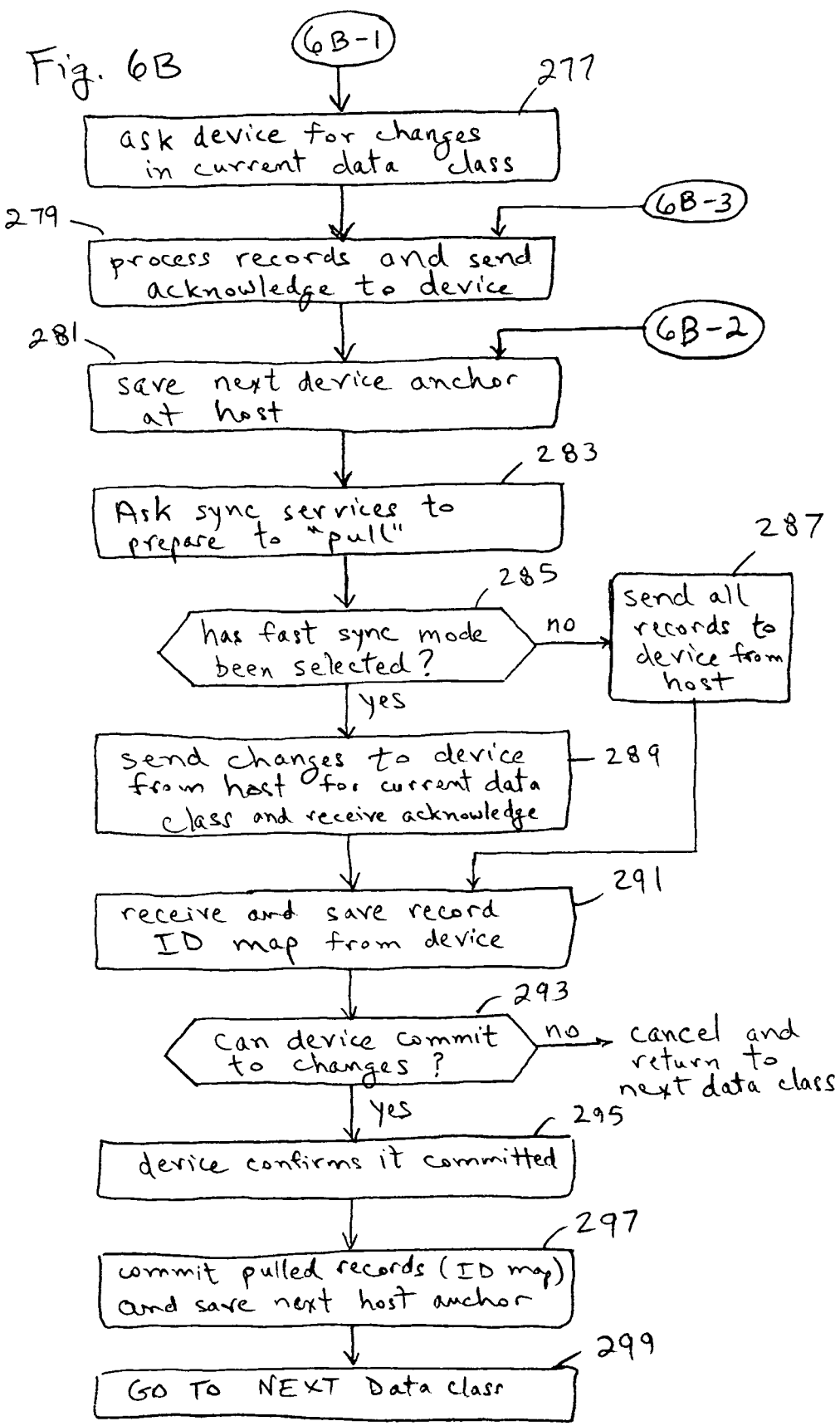

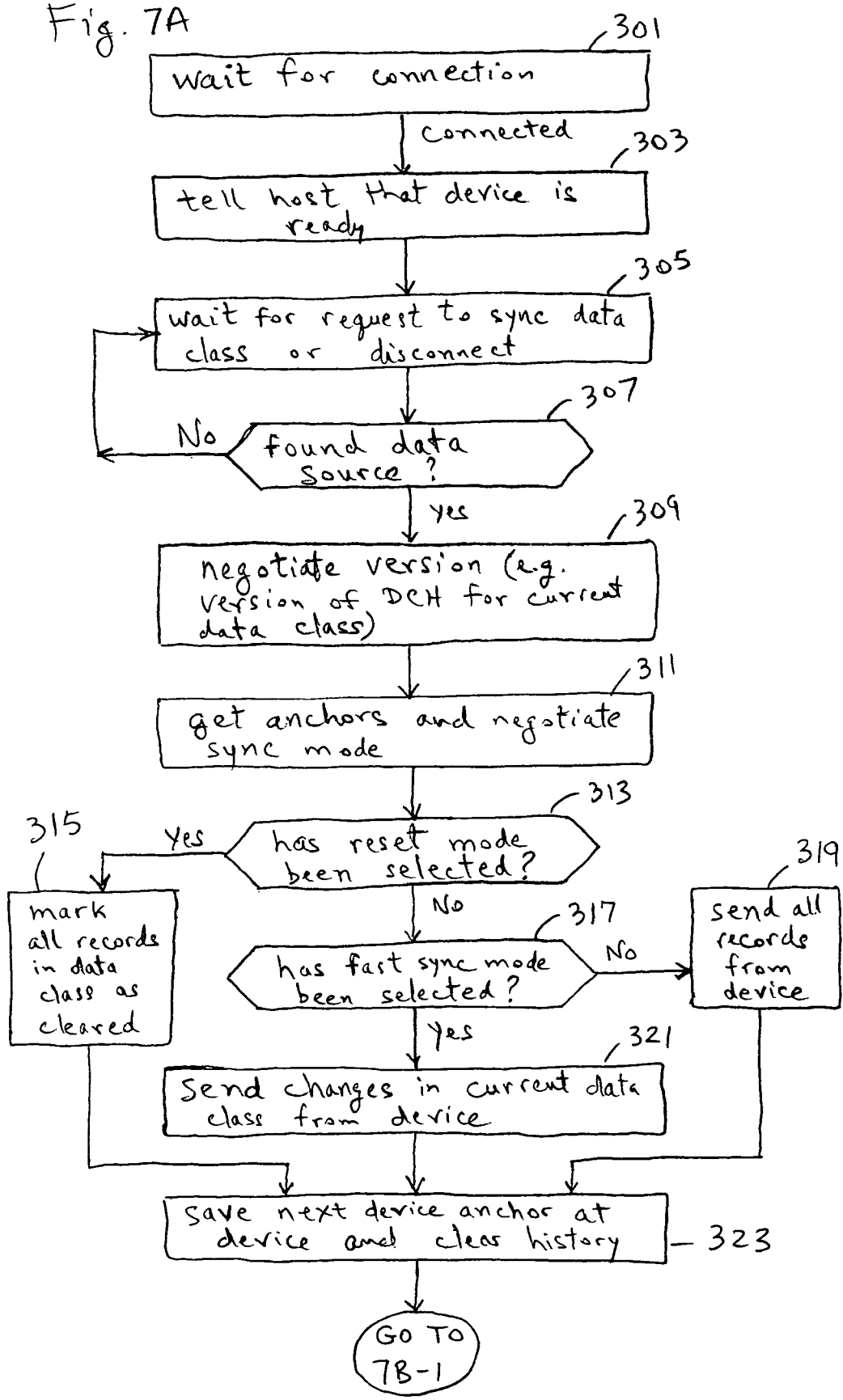

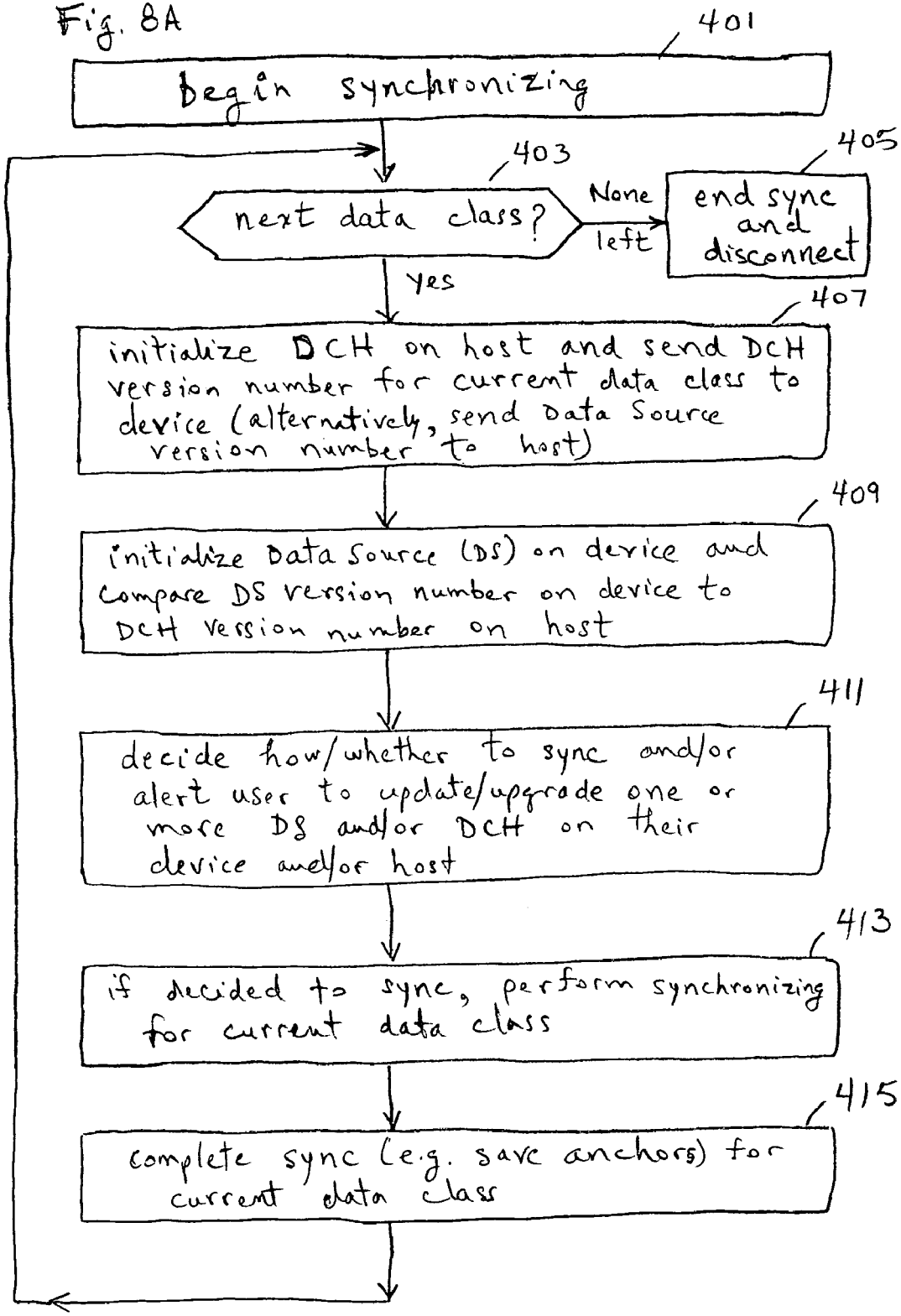

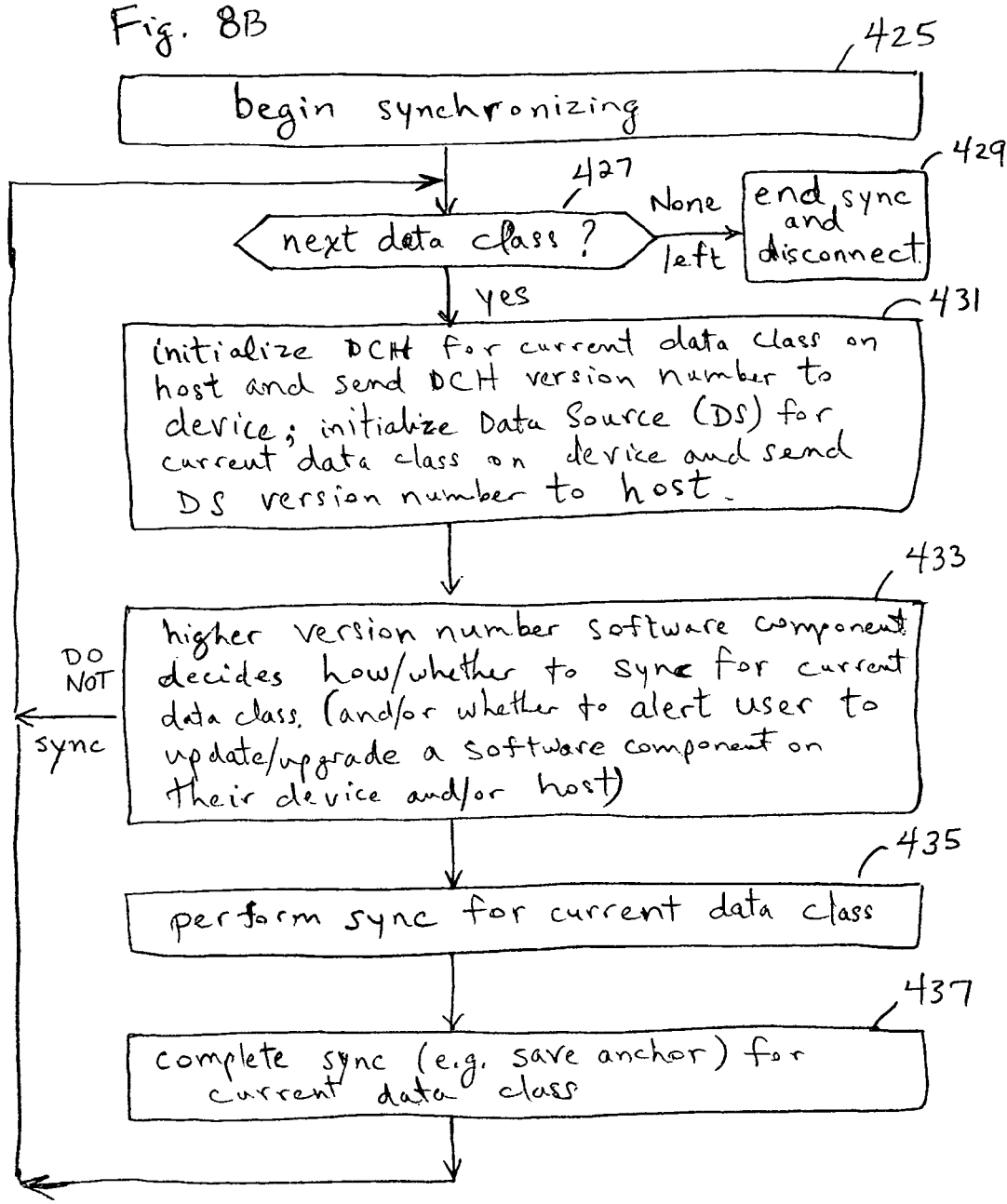

Fig. 9A

Contacts Data Class Structured Data format first name _____    last name _____ address _____ city _____ state _____ country _____ email _____ phone _____ cell phone _____ fax _____ group _____

Fig. 9B

Calendar Data Class Structured Data Format

Subject _____

Location _____

Start  Date _____
       Time _____

End    Date _____
       Time _____

Reminder _____
Invite _____
Notes

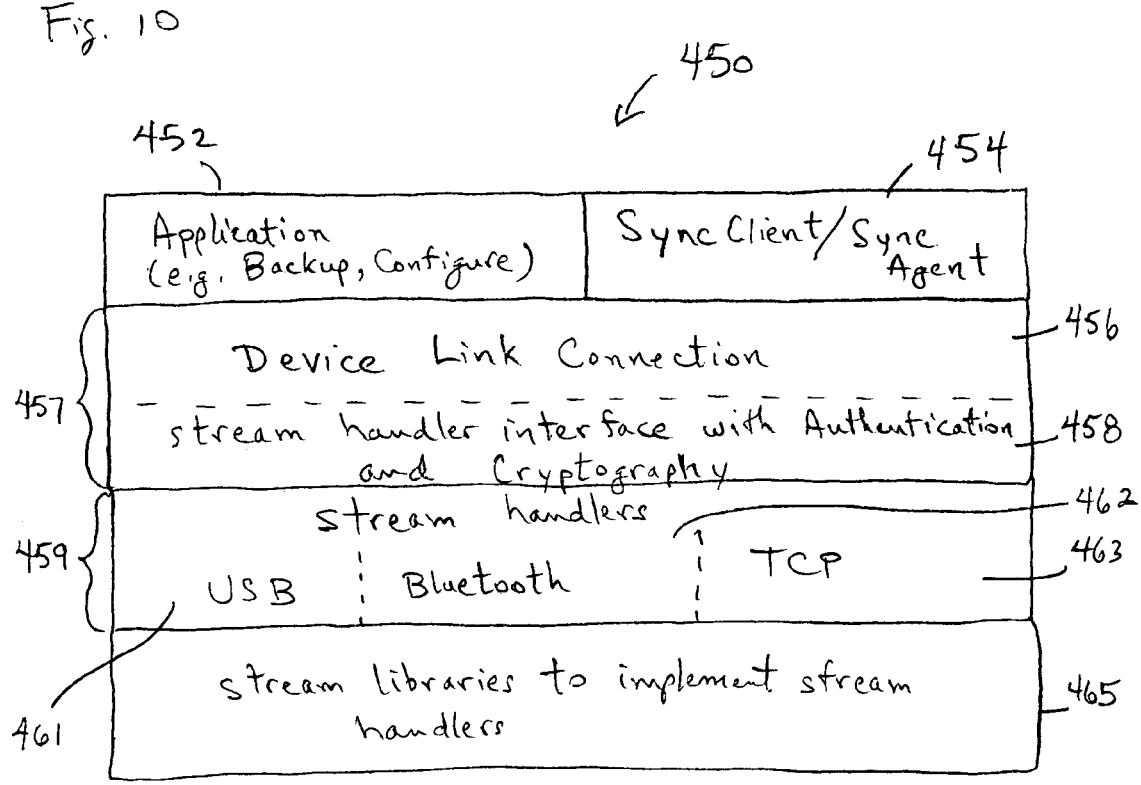

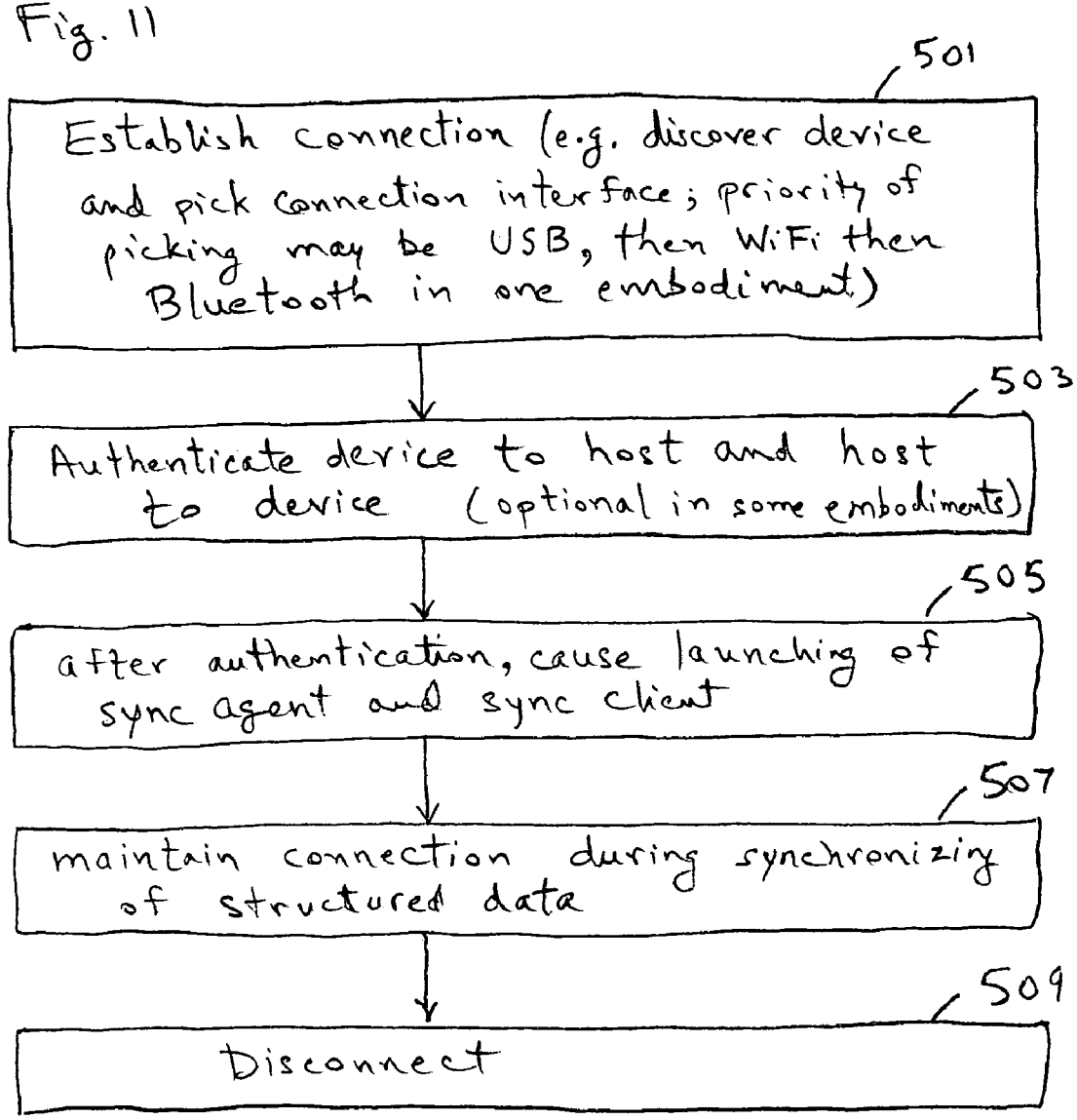

Fig. 12

Device (525)

- 533 — host ID mapped to:
- 529 — device's private key for that host
- 545 — device's certificate used for that host
- 541 — host's certificate for the device
- 537 — host's certificate authority certificate for the device (used in self signed authentication)

Host (527)

- 535 — device ID mapped to:
- 531 — host's private key for the device
- 547 — device's certificate for the host
- 543 — host's certificate for the device
- 539 — host's certificate authority certificate for the device (used in self signed authentication)

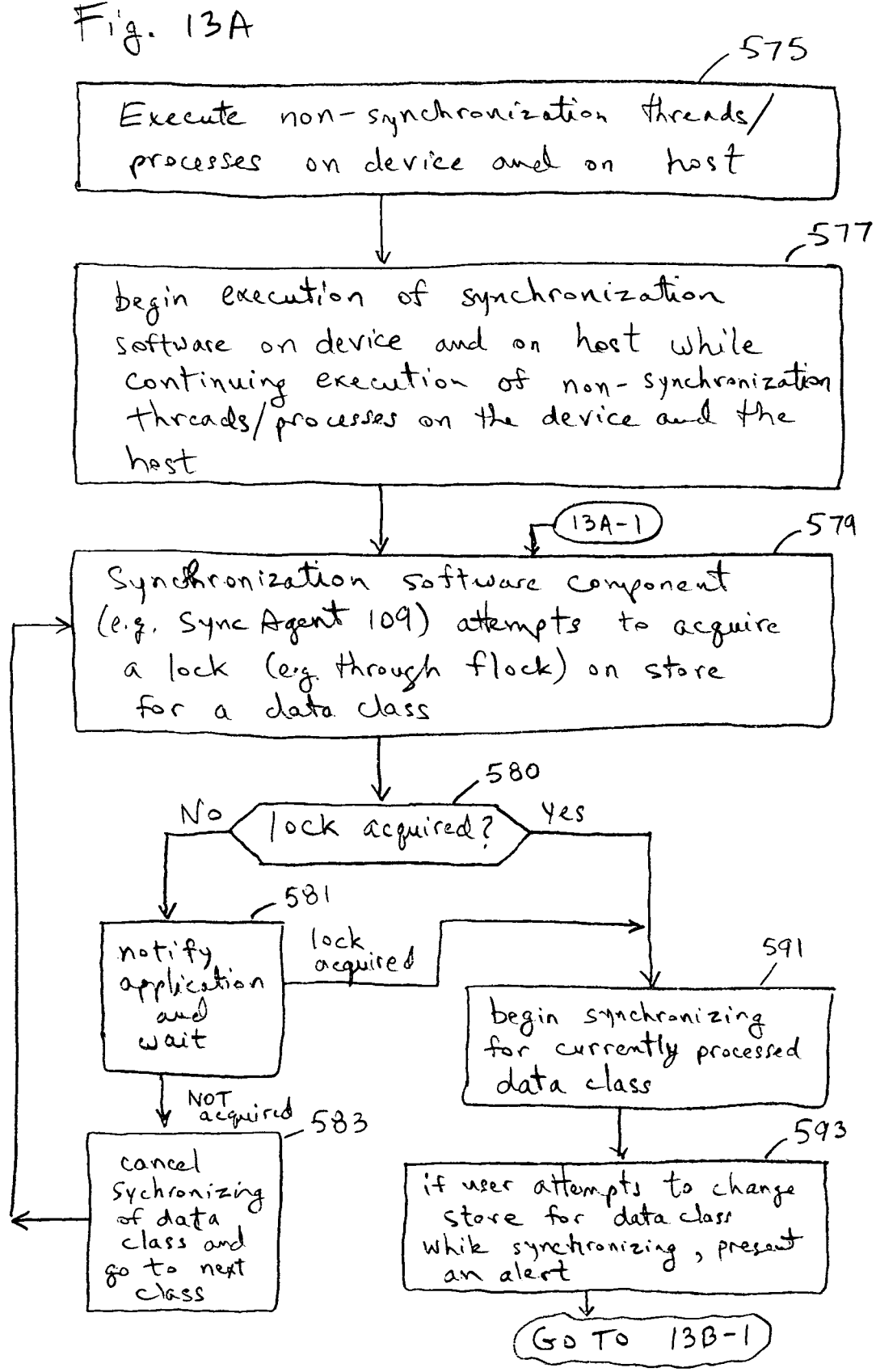

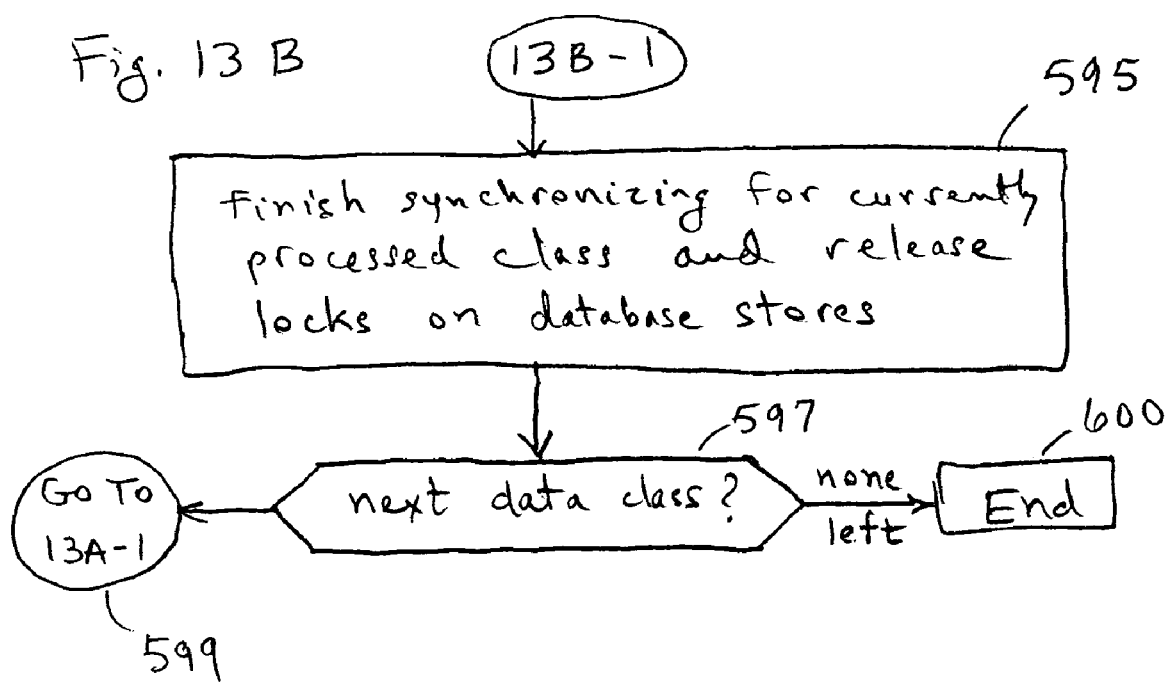

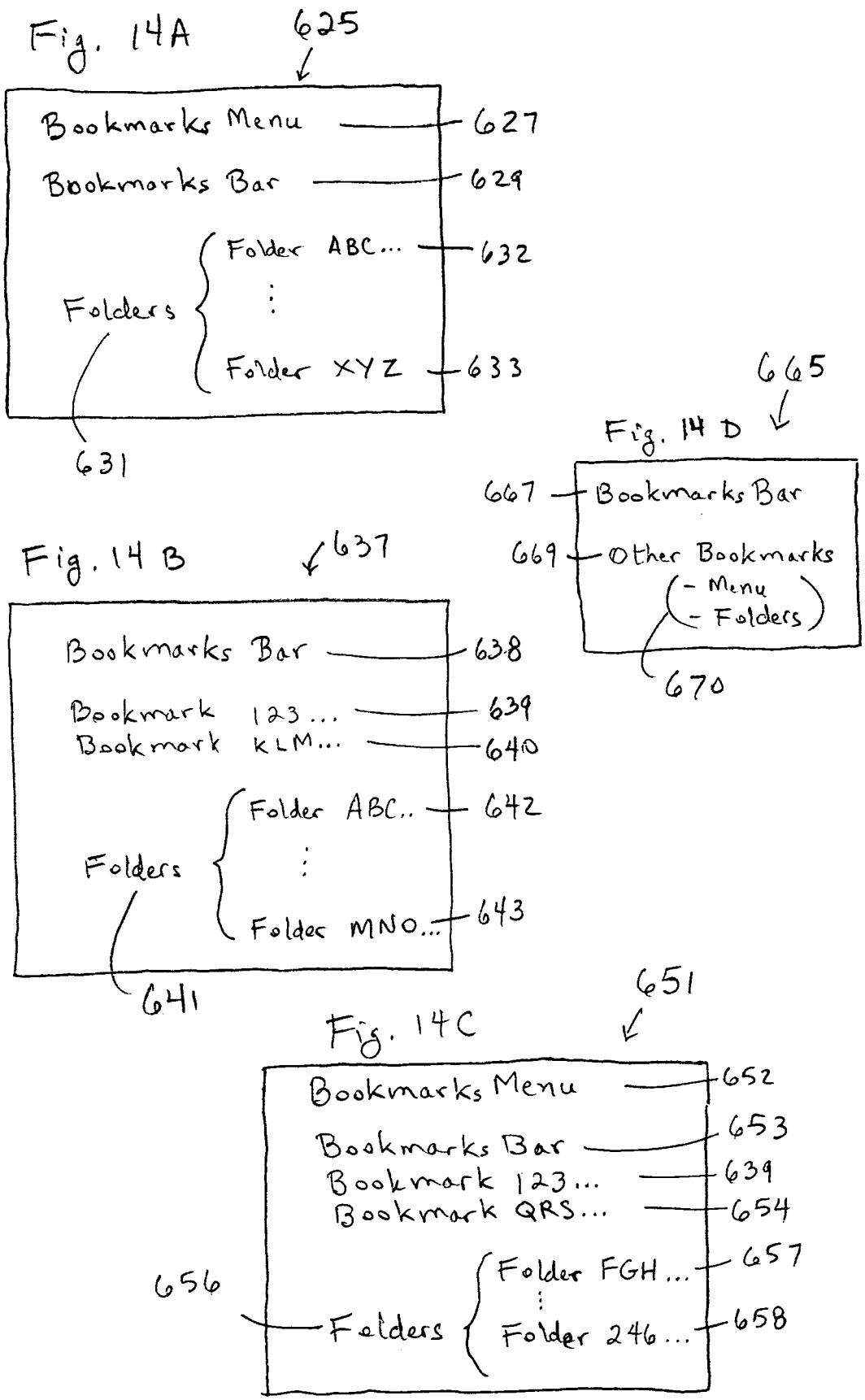

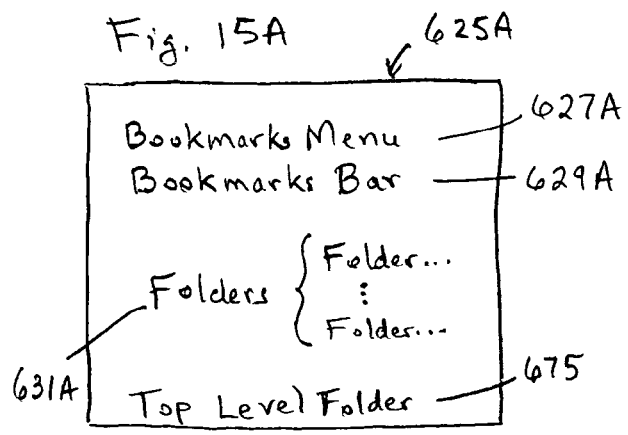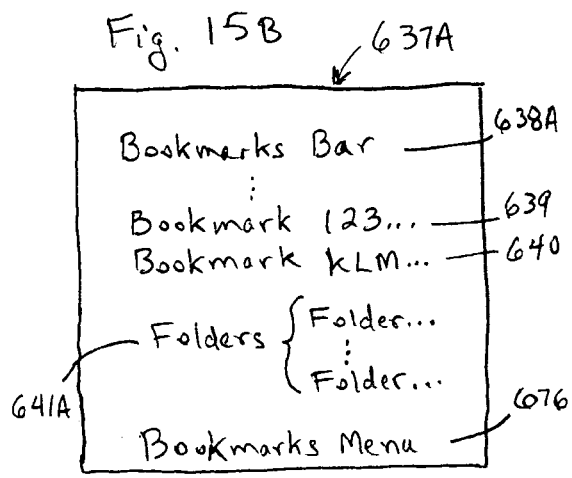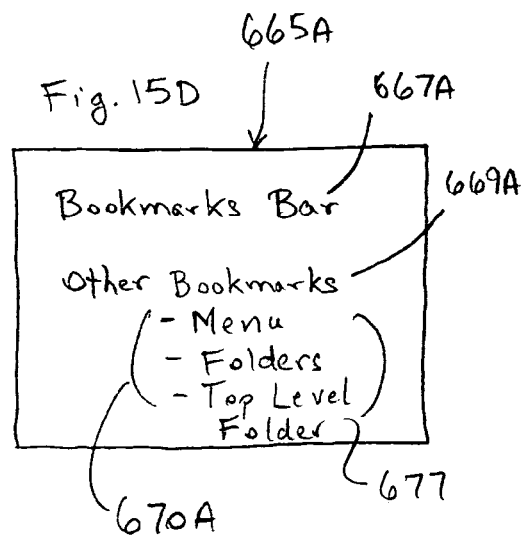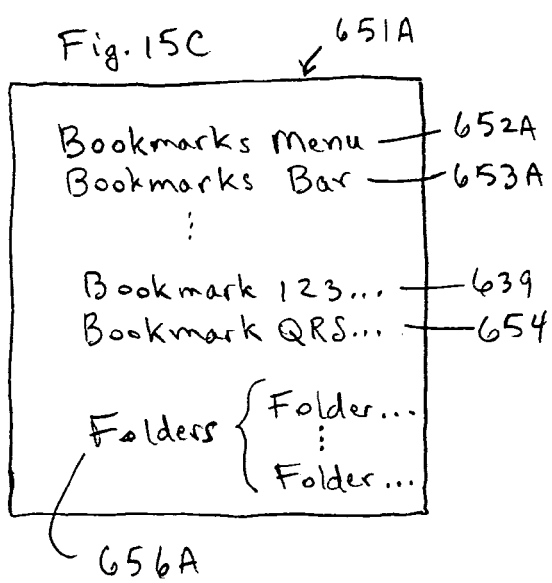

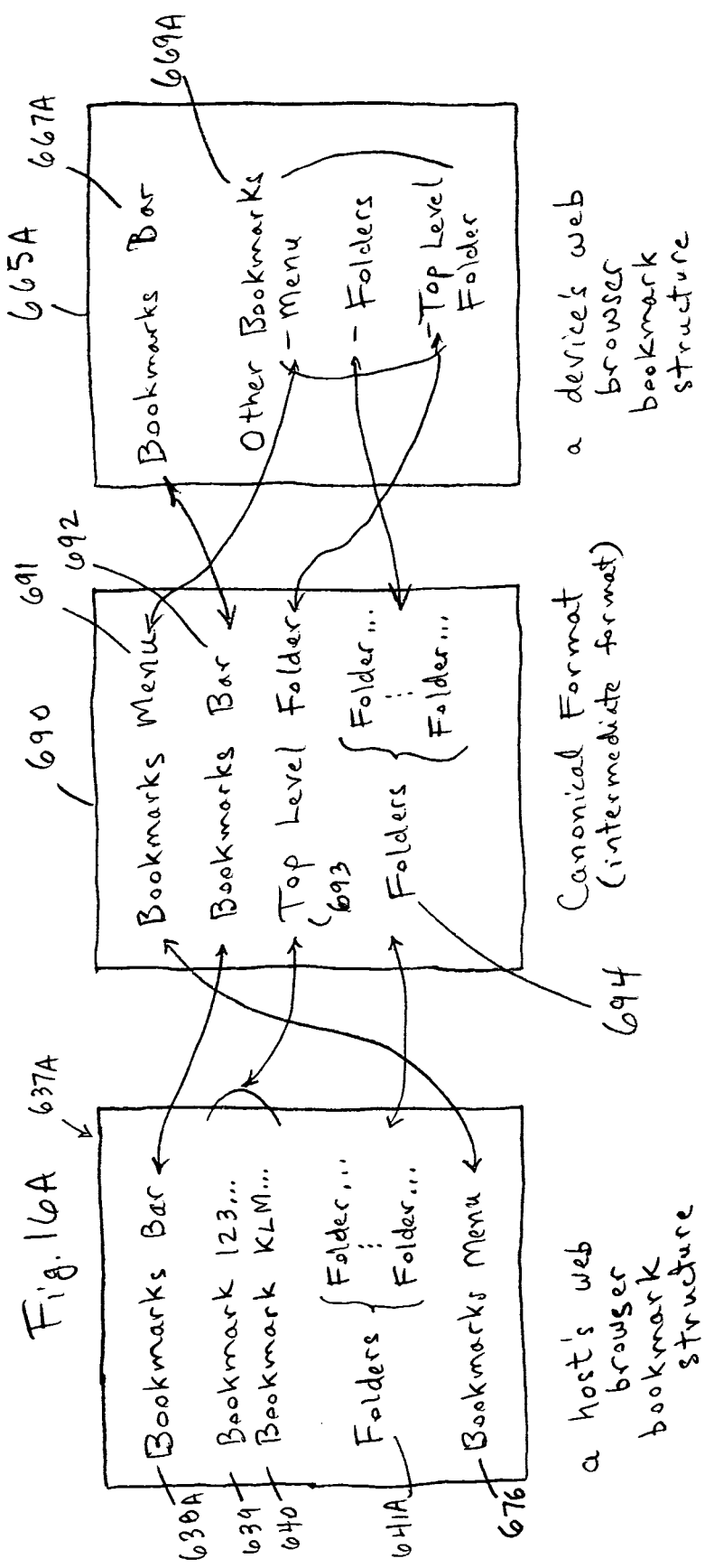

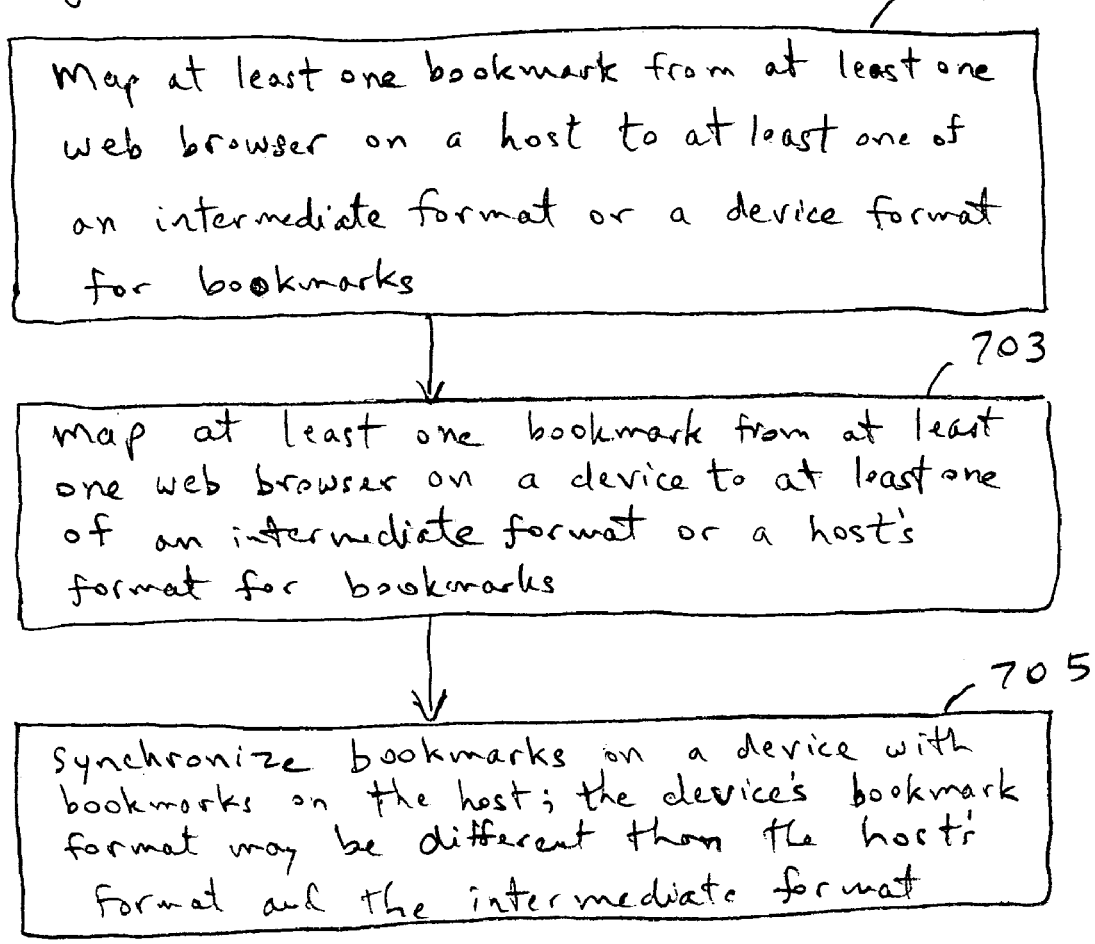

Fig. 16C

715: Map first bookmarks in a first format for a first web browser on a host into an intermediate format (e.g. a canonical format)

717: Map second bookmarks in a second format for a second web browser on the host into the intermediate format 719: Synchronizing the first bookmarks and the second bookmarks with third bookmarks on a device which is coupled to the host during the synchronizing

Fig. 16D  725

Select ONLY one option:

727 ☑ synchronize device's bookmarks to host's bookmarks and host's bookmarks to device's bookmarks (two way synchronization)

729 ☐ synchronize from device's bookmarks to host's bookmarks ONLY (one way synchronization)

731 ☐ synchronize from host's bookmarks to device's bookmarks ONLY

Fig 16E  735

Select ONLY one option:

737 ☐ synchronize bookmarks for all web browsers on both device and host

739 ☑ synchronize bookmarks on device with bookmarks of selected web browsers on host 741 ○ Internet Explorer
742 ⊙ Firefox
743 ⊙ Safari
744 ○ Other

Fig. 16F  750

Select Folders to synchronize

751 ☐ limit synchronization of bookmarks to selected bookmark folders on host's web browser to be synchronized with bookmarks of device

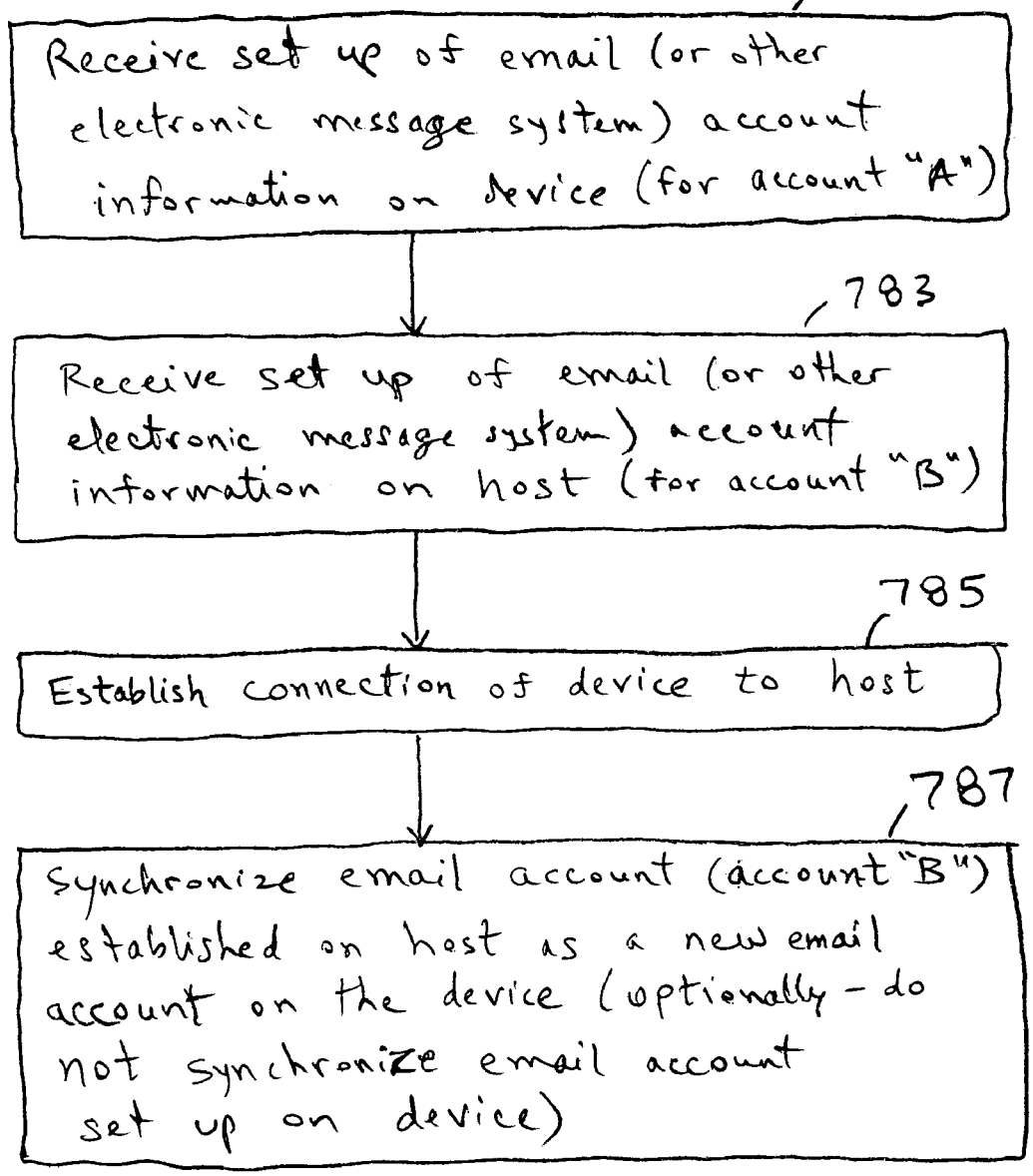

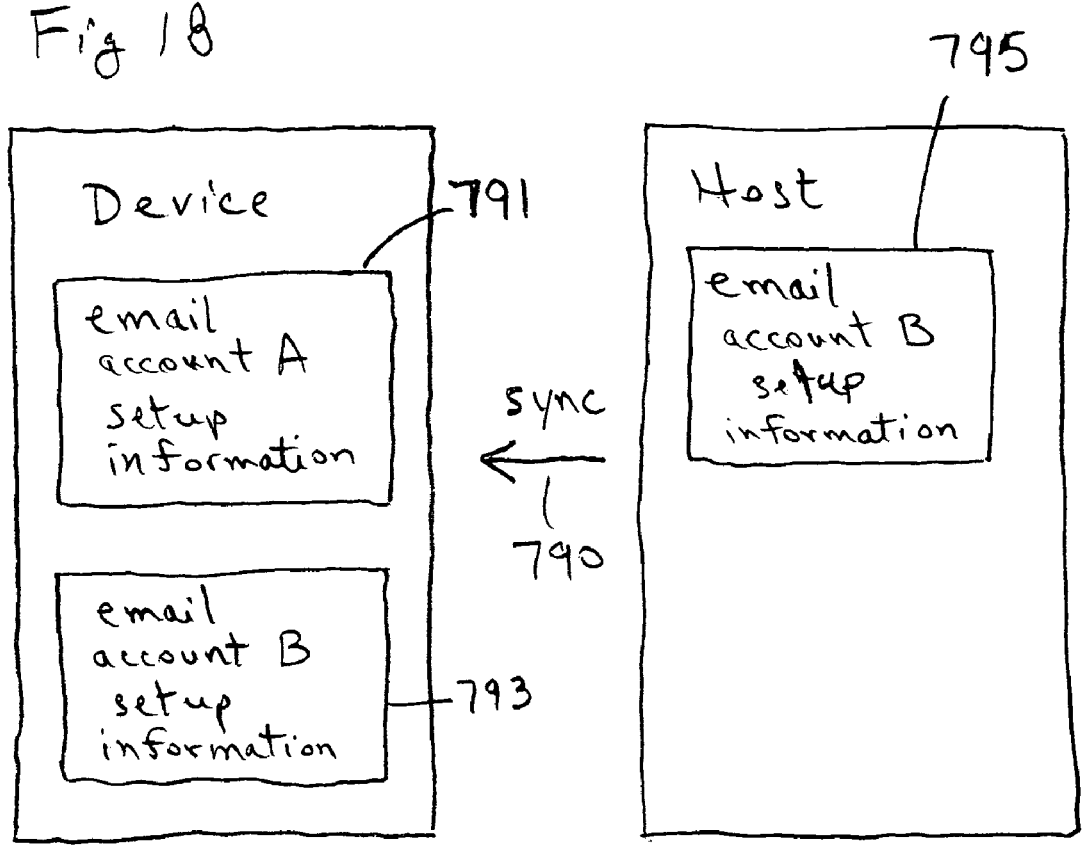

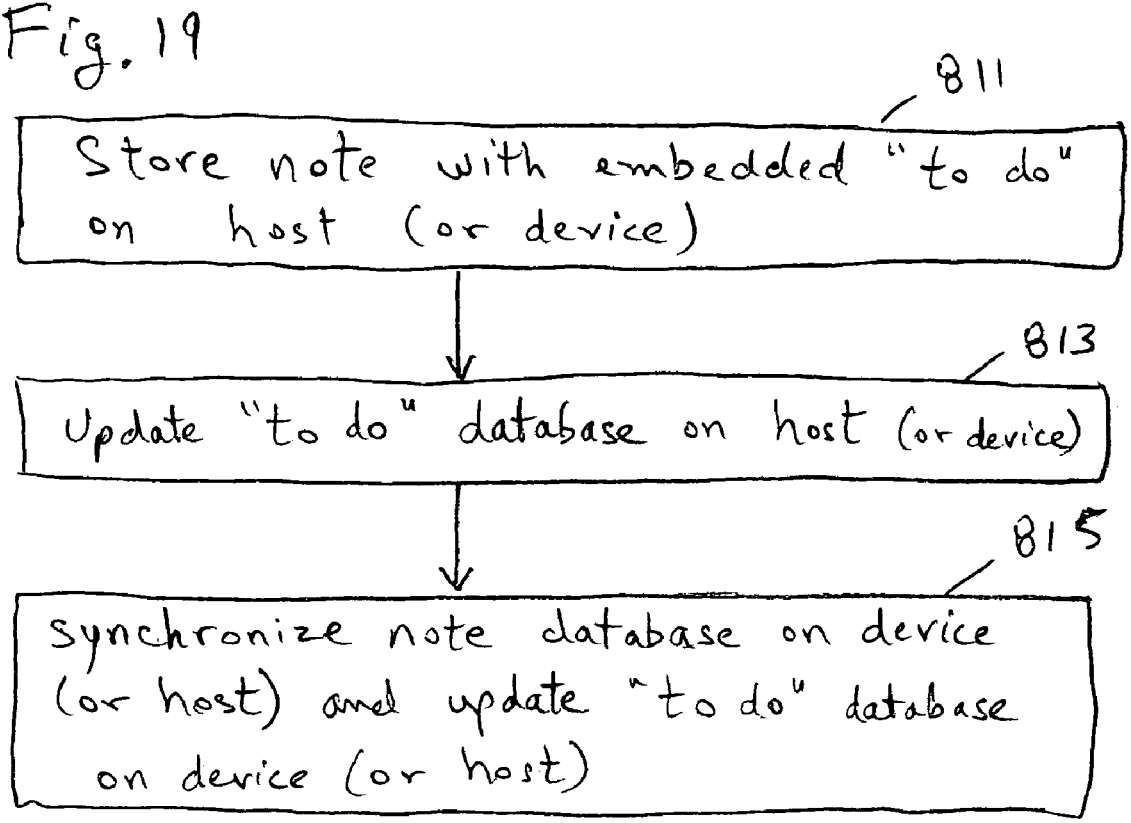

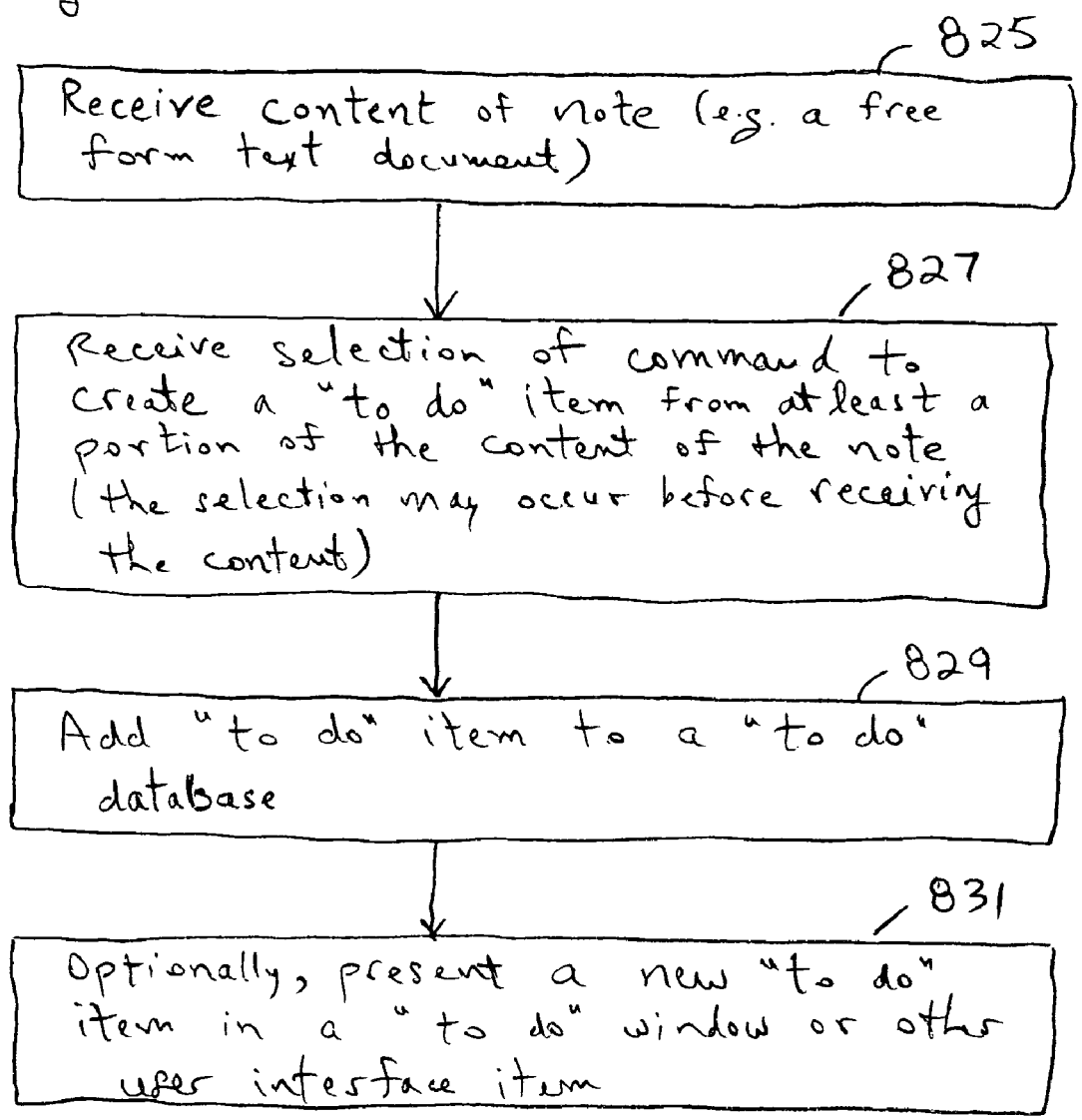

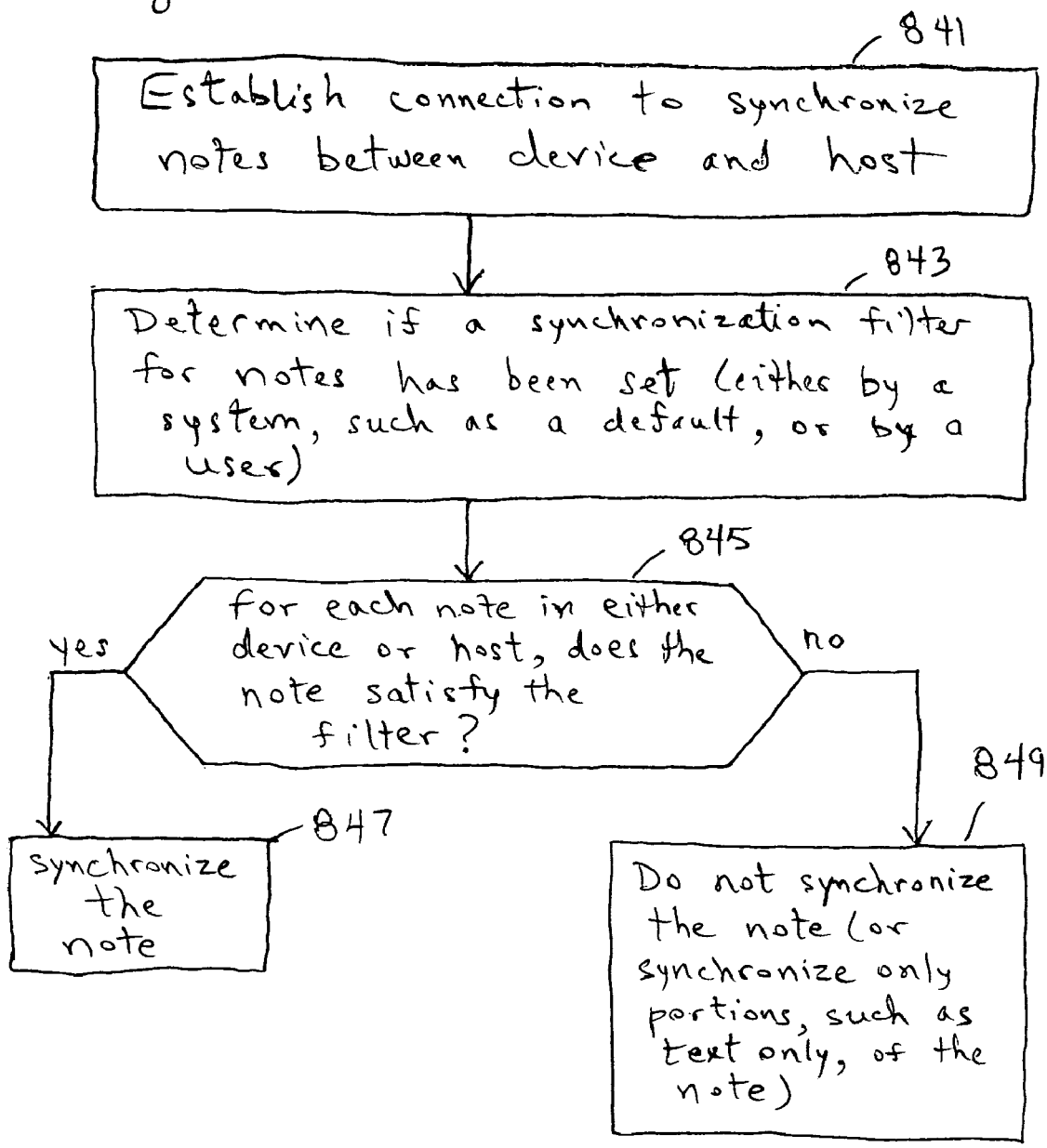

SYNCHRONIZATION METHODS AND SYSTEMS

FIELD OF THE INVENTION

The various embodiments described herein relate to systems and methods for synchronizing data between two or more data processing systems such as a desktop computer system and a handheld computer system.

BACKGROUND OF THE INVENTION

Modern data processing systems, such as a general purpose computer, a handheld computer, a cellular telephone, media players, etc. have been reduced in size to the point that they can often be readily carried around by a user. Furthermore, these devices are powerful enough that they can provide substantial computing power to allow a user to maintain contact information, maintain calendar information, provide email functionality, and even provide web browsing. These devices also may include support for a task or a To Do list or database and other sources of data for a user. An example of a small handheld computer is the Palm Treo, and other examples of handheld computers include those which run a Windows CE operating system.

These handheld computers typically allow a user to synchronize their data between the handheld computer and another computer, such as a user's desktop computer, such that both computers maintain the same set of information, such as the same calendar for the user, thereby allowing the user to view their calendar on either the desktop computer or the handheld computer. The synchronization is typically performed by coupling together the host computer with a handheld computer through a mechanical and electrical connection provided by a dock. FIG. 1 shows an example in the prior art of a handheld computer being coupled mechanically and electrically to a host computer through the dock 26. The system 10 includes the host computer 12 and the handheld computer 14. Synchronization software 16, running on the host, performs the synchronization between the respective databases, such as the contacts database 18 which is synchronized with the handheld contacts database 20. Furthermore, the synchronization software 16 synchronizes the calendar database 22 on the host computer with the handheld's calendar database 24. Synchronization software 16 on the host computer can synchronize each of the databases separately through the use of "conduits." The synchronization software 16 opens and maintains a data connection link through a conduit, and each conduit must implement all the software needed to make and maintain the link in order to synchronize a particular database. The handheld computer merely acts as a storage device by vending its storage memory, such as a hard drive or a flash memory, to the host computer which, through the synchronization software 16, opens each database to perform the synchronization. There is often no active agent on the handheld computer 14 which participates in the synchronization process; in other words, the synchronization software 16 on the host computer 12 performs the synchronization operations for both sets of databases on both devices. When there is a synchronization agent on the handheld computer, it does not have the facilities and architecture described in this disclosure, including, for example, providing a plug-in model on both the handheld and the host for different data classes, and does not allow applications on the handheld computer to run concurrently with the synchronization process, and various other features described herein. There is no use of authentication and encryption using self-signed certificates with private key/public key cryptography. Certain existing systems allow for limited synchronization of emails between a host and a handheld computer, but there is no synchronization of changes in email account setup information. Certain systems also allow for the synchronization of bookmarks for web browsing between a host and a handheld computer. These systems allow for the synchronization of a set of bookmarks having the same format in both the handheld and the host.

Certain synchronization systems are described under the name "SyncML" and further information about these systems can be found at www.openmobilealliance.org and at www.openmobilealliance.org/tech/affiliates/syncml/syncmlindex.html.

SUMMARY OF THE DESCRIPTION

Methods, systems, and computer readable media are described for synchronization of bookmarks and similar data. A bookmark may also be referred to as a "favorite" and may include at least one of a URL (Uniform Resource Locator) or an address of a resource. Different systems may manage differently the structure of a tree or hierarchy of bookmarks. This structure may be referred to as a topology. The topology is used by a system to store bookmarks in different parts of the tree, usually based at least in part upon user preferences. Some systems may allow bookmarks to be present in a top level folder, other systems might allow bookmarks to only be present when contained in a folder, where this folder is either itself contained at the top level, or contained within some tree of folders. Some systems might provide for a folder treated as a "bookmarks bar" or "Bookmarks menu" which has some special meaning to an application, and other systems might not provide these folders, or consider them to have some other meaning. In one embodiment, a method includes storing a mapping relationship between a first topology for bookmarks of a first web browser on a host, and at least one of an intermediate topology and a device topology for bookmarks of a second web browser on a device. The method may also include storing a mapping relationship between the device topology and at least one of the intermediate topology and the first topology, and the method may further include synchronizing bookmarks on the device with bookmarks on the host. The intermediate topology may be a canonical topology and the synchronizing may include adding bookmarks or folders, present on the device but not on the host, to bookmarks of the first web browser, and adding bookmarks, present on the host but not on the device, to bookmarks of the second web browser. The first topology may specify a first structure for at least two of the following: bookmark folders; a bookmark bar; a bookmark menu; and bookmarks at a top level. The device topology may specify a second structure which is different than the first structure.

In at least certain embodiments, the foregoing method allows one or more web browsers on each of the device and host to be synchronized to have the same set of bookmarks despite the fact that different topologies for bookmarks are required by each web browser. For example, some web browsers do not support a bookmark at the top level of a hierarchy of bookmarks, whereas other web browsers do support a bookmark at such top level. Further, some web browsers do not include a bookmark menu or may not include a bookmark bar, while other web browsers include such features. In at least certain embodiments, the canonical topology maintained on either the host or the device, allows for the conversion between the bookmark structures so that synchronization between different bookmark topologies and structures can be maintained across multiple web browsers.

In another embodiment, a method includes storing first data representing at least one bookmark, wherein the storing is part of a synchronizing process between a first data processing system and a second data processing system. The first data is obtained through a first conversion between a first topology for bookmarks of a first web browser on the first data processing system and at least one of an intermediate topology and a second topology for bookmarks of a second web browser on the second data processing system. The method further includes transmitting second data representing at least one bookmark, the transmitting being part of the synchronizing process. The second data is to be stored according to a second conversion between the second topology and at least one of the first topology and the intermediate topology.

In yet another embodiment, a method includes storing a mapping relationship between a first topology for bookmarks of a first web browser on a device and at least one of an intermediate topology and a host topology for bookmarks of a second web browser on the host. The method further includes synchronizing bookmarks on the device with bookmarks on the host.

In at least certain embodiments, a user interface may be presented to the user to allow the user to alter the intermediate topology or the canonical topology and to also limit the synchronization to less than all web browsers and to also limit the synchronization to one or more selected folders in one or more bookmark structures of one or more web browsers on the host and the device.

Other systems and methods are also described, and computer readable media, which contain executable instructions to cause a computer to operate as described herein, are also described.

BRIEF DESCRIPTION OF THE DRAWINGS

The present invention is illustrated by way of example and not limitation in the figures of the accompanying drawings in which like references indicate similar elements.

FIG. 4 shows an example of a software architecture for implementing synchronization between, for example, a device and a host.

FIG. 5 is a flow chart showing events in time between a device and a host according to one example of a synchronization process.

FIGS. 6A and 6B are flow charts which illustrate a synchronization process on, for example, a host.

FIGS. 7A and 7B are flow charts illustrating a synchronization process on, for example, a device.

FIGS. 8A and 8B are flow charts illustrating the use of version identifiers according to at least certain embodiments of the inventions.

FIGS. 9A and 9B illustrate two examples of data formats for two different types of data classes; in particular, FIG. 9A shows a data format for a contacts data class which contains structured data, and FIG. 9B shows a data format for a calendar data class.

FIG. 10 shows an example of a software architecture having multiple layers as described herein.

FIG. 11 is a flow chart illustrating an embodiment of a method which may be performed with the software architecture shown in FIG. 10.

FIG. 12 illustrates the result of a two-way authentication process which may be used in at least certain embodiments described herein.

FIGS. 13A and 13B are flowcharts which illustrate one method in which synchronization and non-synchronization operations may be performed concurrently by one or both of a host and a device during a synchronization process.

FIGS. 14A, 14B, 14C, and 14D illustrate various possible formats for bookmarks for different types of web browsers.

FIGS. 15A, 15B, 15C, and 15D illustrate a modified bookmark structure which occurs after synchronization through, in at least one embodiment, an intermediate or canonical format for a bookmark data structure.

FIG. 16A shows an example of mapping relationships between a web browser on a host and a web browser on a device, wherein this mapping relationship also shows the mapping between the data structure of the bookmarks on the host and the device relative to an intermediate format.

FIG. 16B is a flow chart illustrating a method according to one embodiment described herein.

FIG. 16C is a flow chart illustrating another embodiment relating to the synchronization of bookmarks.

FIGS. 16D, 16E, and 16F provide examples of user interfaces for allowing preference settings with respect to the synchronization of bookmarks between two data processing systems, such as between a device and a host.

FIG. 17 is a flow chart illustrating a method for synchronization of email account or other electronic message account setup information.

FIG. 18 shows a memory of a device and a memory of a host which store email account setup information as shown in the figure.

FIG. 19 is a flow chart which illustrates one method for synchronizing notes which may include embedded To Do's in at least certain embodiments described herein.

FIG. 20 is a flow chart illustrating an embodiment of a method for creating a To Do within a note to create an embedded To Do.

FIG. 21 shows an example of a method for using a filter to decide whether or not a note is to be synchronized.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a through understanding of various embodiments of the present invention. However, in certain instances, well-known or conventional details are not described in order to provide a concise discussion of embodiments of the present inventions.

The present invention can relate to an apparatus for performing one or more of the operations described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a bus.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Figure 1:
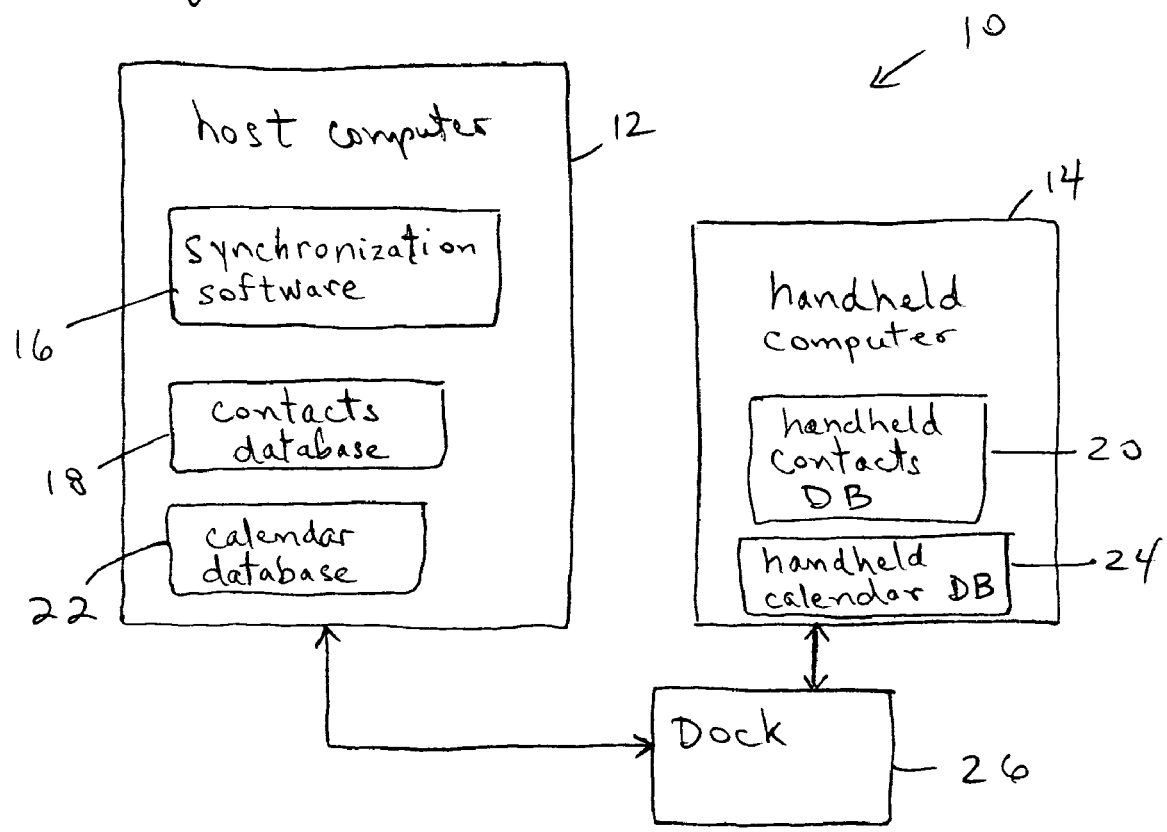
FIG. 1 shows in block diagram form an example of a prior art synchronization system.
Figure 2:
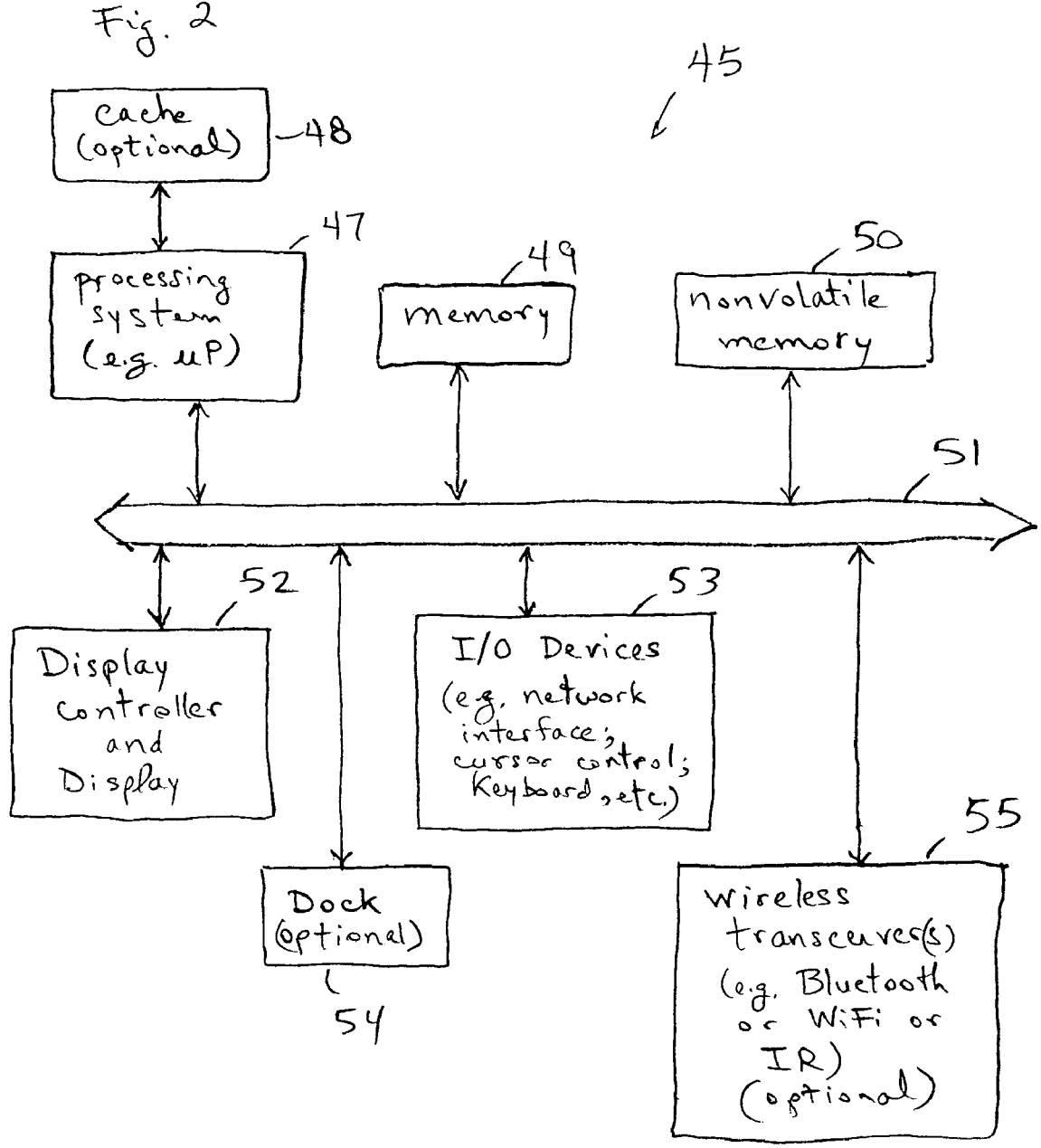
FIG. 2 shows an example of a data processing system, such as a host computer.
Figure 3:
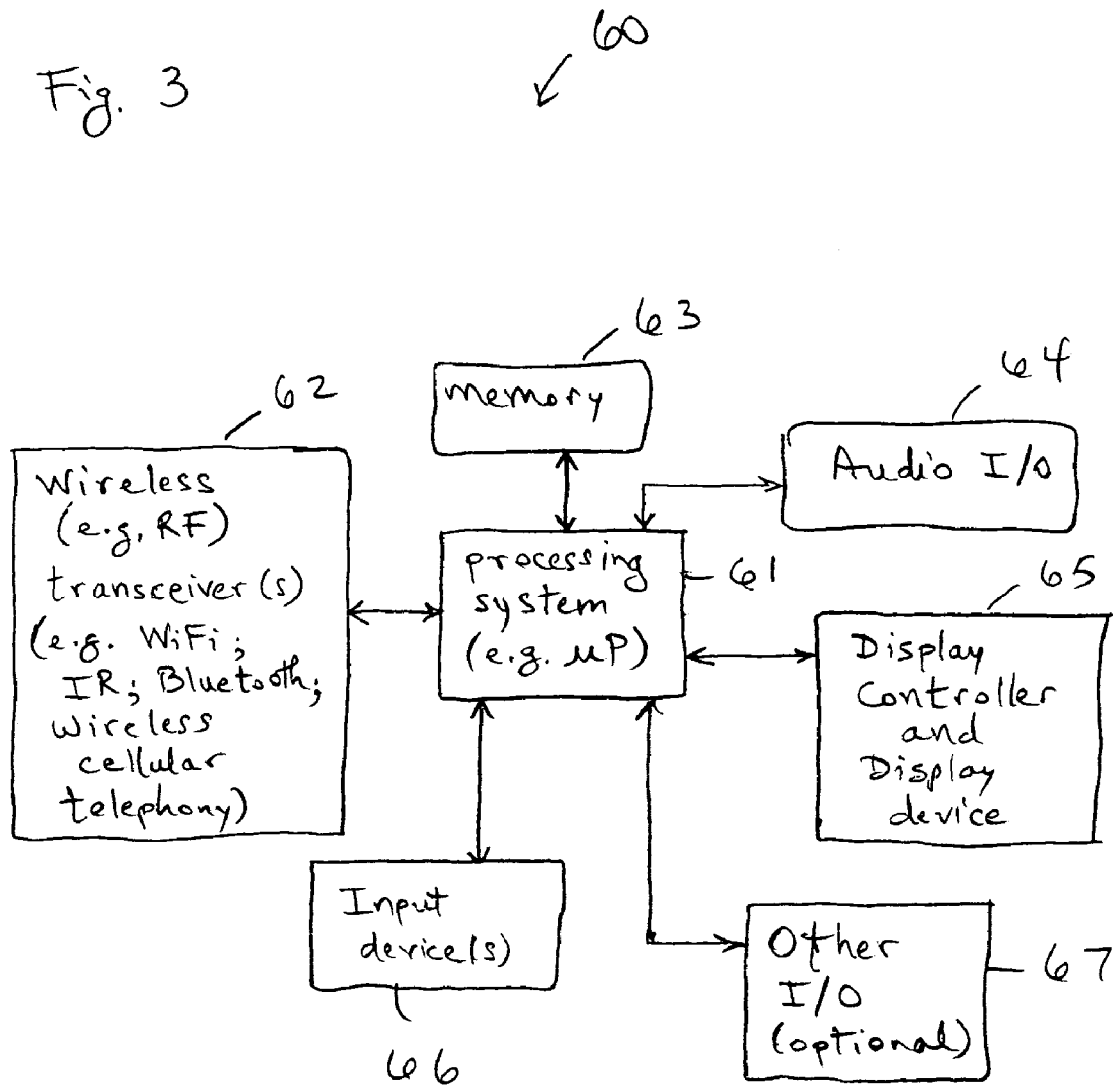
FIG. 3 shows an example of a data processing system, such as a handheld computer or other type of data processing system.

Prior to describing the various different embodiments in connection with synchronization architectures, systems, methods and computer readable media, a brief discussion will be provided in connection with the data processing systems which may be part of the synchronization process. The term "host" and the term "device" are intended to refer generally to data processing systems rather than specifically to a particular form factor for the host versus a form factor for the device. FIGS. 2 and 3 show examples of two different data processing systems, where the system shown in FIG. 2 may be referred to as a host while the system shown in FIG. 3 may be referred to as a device, although the system shown in FIG. 2 may be referred to as a device while the system shown in FIG. 3 may be referred to as a host.

FIG. 2 shows one example of a computer system which is a form of a data processing system. Note that while FIG. 2 illustrates various components of a computer system, it is not intended to represent any particular architecture or manner of interconnecting the components as such details are not germane to the present inventions. It will also be appreciated that personal digital assistants (PDAs), cellular telephones, media players (e.g. an iPod), devices which combine aspects or functions of these devices (a media player combined with a PDA and a cellular telephone in one device), network computers, an embedded processing device within another device, and other data processing systems which have fewer components or perhaps more components may also be used to implement one or more embodiments of the present inventions and may be one or more of the data processing systems described herein. The computer system shown in FIG. 2 may, for example, be a Macintosh computer from Apple Computer, Inc. or a computer which runs the Windows operating software from Microsoft Corporation.

As shown in FIG. 2, the computer system 45 includes a bus 51 which is coupled to one or more microprocessors which form a processing system 47. The bus 51 is also coupled to memory 49 and to a non-volatile memory 50, which may be a magnetic hard drive in certain embodiments, or flash memory in other embodiments. The bus is also coupled to a display controller and display 52 and one or more input/output (I/O) devices 53. Further, the bus is coupled to an optional dock 54 and to one or more wireless transceivers 55, which may be a Bluetooth transceiver or a WiFi transceiver or an infrared transceiver. It will be appreciated that the wireless transceivers 55 are optional as shown in FIG. 2. The processing system 47 may optionally be coupled to optional cache 48. The processing system 47 may include one or more microprocessors, such as a microprocessor from Intel or IBM. The bus 51 interconnects these various components together in a manner which is known in the art. Typically, the input/output devices 53 are coupled to the system through input/output controllers. The memory 49 may be implemented as dynamic RAM (DRAM) which provides fast access to data but requires power continually in order to refresh or maintain the data in the memory. The non-volatile memory 50 may be a magnetic hard drive or other non-volatile memory which retains data even after power is removed from the system. While FIG. 2 shows that the non-volatile memory 50 is a local device coupled directly to the rest of the components in the data processing system, it will be appreciated that other embodiments may utilize a non-volatile memory which is remote from a system, such as a network storage device, which is coupled to the data processing system through a network interface, such as a modem or an Ethernet interface. The bus 51, as is well known in the art, may include one or more buses connected to each other through various bridges, controllers, and/or adapters as is known in the art. In one embodiment, the I/O controller 53 may include a USB adapter for controlling USB peripherals and an IEEE-1394 controller for IEEE-1394 compliant peripherals.

It will be apparent from this description that aspects of the inventions may be embodied, at least in part, in software. That is, the techniques may be carried out in a computer system or other data processing system in response to its processor or processing system executing sequences of instructions contained in a memory, such as memory 49 or non-volatile memory 50 or the memory 63 shown in FIG. 3. In various embodiments, hardwired circuitry may be used in combination with the software instructions to implement the present inventions. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize that what is meant by such expressions is that the functions result from execution of the code by a processing system.

The dock 54 and/or the wireless transceivers 55 provide a physical interface for coupling the data processing system shown in FIG. 2 to another data processing system, such as the data processing system shown in FIG. 3, or to another data processing system which resembles the system shown in FIG. 2. The dock 54 may be similar to a dock in the prior art, such as the dock 26, such that it provides both a mechanical and electrical connection between one data processing system and another data processing system to allow a synchronization process to be performed between the two systems. In other embodiments, the wireless transceivers 55 may provide an electrical connection between the two systems for the purpose of a synchronization process without providing a mechanical connection between the two systems.

FIG. 3 shows an example of another data processing system which may synchronize data with other data processing systems, such as the system shown in FIG. 2 or a system which is similar to that shown in FIG. 3. The data processing system 60 shown in FIG. 3 includes a processing system, which may be one or more microprocessors, or which may be a system on a chip integrated circuit, and the system also includes memory 63 for storing data and programs for execution by the processing system. The system 60 also includes an audio input/output subsystem 64 which may include a microphone and a speaker for, for example, playing back music or providing telephone functionality through the speaker and microphone. A display controller and display device 65 provide a visual user interface for the user; this digital interface may include a graphical user interface which is similar to that shown on a Macintosh computer when running OS X operating system software. The system 60 also includes one or more wireless transceivers, such as a WiFi transceiver, an infrared transceiver, a Bluetooth transceiver, and/or a wireless cellular telephony transceiver. It will be appreciated that additional components, not shown, may also be part of the system 60 in certain embodiments, and in certain embodiments fewer components than shown in FIG. 3 may also be used in a data processing system. The data processing system 60 also includes one or more input devices 66 which are provided to allow a user to provide input to the system. These input devices may be a keypad or a keyboard or a touch panel or a multi-touch panel. The data processing system 60 also includes an optional input/output device 67 which may be a connector for a dock, such as the dock 54 shown in FIG. 2. It will be appreciated that one or more buses, not shown, may be used to interconnect the various components as is well known in the art. The data processing system shown in FIG. 3 may be a handheld computer or a personal digital assistant (PDA), or a cellular telephone with PDA-like functionality, or a handheld computer which includes a cellular telephone, or a media player, such as an iPod, or devices which combine aspects or functions of these devices, such as a media player combined with a PDA and a cellular telephone in one device. In other embodiments, the data processing system 60 may be a network computer or an embedded processing device within another device, or other types of data processing systems which have fewer components or perhaps more components than that shown in FIG. 3.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod® or iPod Nano® media player from Apple Computer, Inc. of Cupertino, Calif., a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s). Examples of a portable media player are described in published U.S. patent application Nos. 2003/0095096 and 2004/0224638, both of which are incorporated herein by reference.

In certain embodiments, the data processing system 60 may be implemented in a small form factor which resembles a handheld computer having a tablet-like input device which may be a multi-touch input panel device which is integrated with a liquid crystal display. Examples of such devices are provided in U.S. patent application Ser. No. 11/586,862, filed Oct. 24, 2006, and entitled "AUTOMATED RESPONSE TO AND SENSING OF USER ACTIVITY IN PORTABLE DEVICES," which is assigned to the same assignee as the instant application. This foregoing application is hereby incorporated herein by reference.

In the following description, various software components which are used for both synchronization and non-synchronization processing operations are described. It will be understood that in at least certain embodiments, these various software components may be stored in the memory 49 and/or memory 50 shown in FIG. 2 for one type of data processing system, and in the case of a system such as that shown in FIG. 3, these various different software components may be stored in the memory 63 which may include volatile memory as well as non-volatile memory, such as flash memory or a magnetic hard drive.

FIG. 4 shows an example of an embodiment of a particular software architecture for a synchronization system between one or more data processing systems, such as a device, which may be a handheld computer, and a host, which may be a desktop or a laptop computer. This software architecture may be used to implement one or more of the various embodiments described herein, such as the methods shown in FIGS. 5, 6A, 6B, 7A, and 7B, and FIGS. 8A and 8B. This synchronization system may be used to synchronize structured data, such as data in a contacts or address database. Different data typically have different structures or formats which specify how the data is organized and formatted. These are referred to as data classes, and FIGS. 9A and 9B provide examples of two different structured data formats for two different data classes. In particular, FIG. 9A shows a data format for a contacts data class, and FIG. 9B shows a format for a calendar data class format. The synchronization system shown in FIG. 4 may be used to synchronize calendar data between two different calendar stores on the two different systems and to also synchronize contact data between the two contact stores on the two systems as will be described further below.

The software architecture shown in FIG. 4 includes a plurality of software components on the device side 101 and a plurality of software components on the host side 103. There is, in addition, device link software 107 which in effect bridges the connection between the two software components which are separated by the line 105 which represents the physical separation between the device and the host. It will be appreciated that the software components on each side are stored in respective memory on each data processing system. The device includes one or more user application programs which are used to access and edit structured data in a particular data class. FIG. 4 shows examples of three such user application programs. In particular, calendar application program 125 is used to access and edit calendar data in the calendar store database 119. Similarly, the contacts application program is used by a user to access and edit contacts or address book information stored in the contacts store database 121. Similarly, the other application programs 129, which may include a notes application program, widget programs for presenting widgets, a web browser having bookmarks, an email program which includes email account setup information, a To Do list program, and possibly other programs which have structured data, are represented by the other application programs 129 which have access to and provide the ability to edit information in other stored databases 123. These user application programs, such as application programs 125 and 127, are separate from the synchronization software components which are responsible for synchronizing structured data in each of the different classes. These software components are shown in FIG. 4 as data sources 113, 115, and 117. In particular, the calendar data source 113 is responsible for causing the retrieval and storage of the structured data from its particular data class, which is the calendar data class, during a synchronization process. Similarly, the contacts data source 115 is responsible for causing the retrieval and storage of structured data in the contacts stored database 121, which may represent the user's address book or other contact information database. Similarly, other data sources, such as other data sources 117, are responsible for causing the retrieval and storage of structured data from other structured data stores. This may include databases for notes, emails, bookmarks, and/or To Do lists and other databases or stores of data. The data sources may also perform other functions, such as formatting the data either for storage on the device or for transmission to the host, transmitting and/or receiving version identifiers with respect to each data source relative to each data class handler for a particular data class, sending device and host anchors as described herein in order to ensure that synchronization operations are performed as atomic transactions to ensure that the synchronization is either completed or not, allowing the system to roll back to a prior state if it is not completed (in order to ensure that synchronization can be performed even if the connection is interrupted). Further, the data sources may also remap unique identification values for records on the device to records on the host so that the device can maintain a unique record regardless of a record ID (identifier) provided by a host. Each data source is coupled through software based messages to a sync agent software component 109 which is responsible for, at least in part, maintaining a data connection between the device and the host through a device link software stack 107, an example of which is shown in FIG. 10 and described herein. The sync agent 109 provides services, through software based messages, such as calls or APIs (Application Program Interface), to various data sources. In at least one embodiment, the sync agent 109 may implement or handle or determine the order of synchronization of the various data classes by specifying directly or indirectly the order. For example, the sync agent 109 may determine and specify that the calendar data class is synchronized first and then the contacts data class is synchronized next and then the To Do list data class is synchronized next, etc. The sync agent 109, in another embodiment, may receive the order through one or more commands or messages from the sync client and, in turn, may implement that order by sending messages to the data sources in that order. The sync agent 109 also alerts a data source if a link fails when synchronization is occurring, and it will tell the data source to roll back to a prior synchronization state if the link fails before synchronization is completed. Further, the sync agent may ask a data source to commit changes if the synchronization has been successful, which causes the data source to write the data to a particular store for the particular data class.

The software architecture of FIG. 4 provides abstractions that allow plugging in of many different data classes; including "after market" plug-ins by third party suppliers in at least certain embodiments. In effect, this architecture creates a "sync client" which is split into two pieces (one on the host in the form of synch client 111 and one on the device in the form of sync agent 109) and uses a sync server, in the form of sync services 141, which operates with both the synch client 111 and the sync agent 109. The device, in an embodiment in this architecture, does not interact directly with the sync server (e.g. sync services 141) but instead exchanges messages with the sync client 111 which interacts (through software based messages) with the sync server. In one embodiment, the Sync Server manages storing, comparing (mingling), and differencing data from various clients (applications, other servers, and Sync Client for a device). The Sync Client, in one embodiment, manages the connection (with authentication and cryptography) to the device, transferring and modifying data between the device and the computer, as well as handling sync anchors, control flow to arbitrate between the sync server and the device, checking versioning of data classes, and providing a plug-in model to optimize and organize handling of different data classes (DataClassHandlers). The Sync Client, in one embodiment, also does all the filtering (only syncing contacts in specific groups, or events in specific calendars, events within a date range, a subset of mail accounts, and notes or note attachments with a size threshold). In one embodiment, SyncAgent has a plug-in model for Data Sources, and runs as a separate process from applications on the device which manage/display the data, but can interact with them in parallel (with locking, or concurrent access), and notifies the applications when data changes.

The device link software component 107 includes a plurality of software components, such as the layers of software components shown in FIG. 10, and the device link 107 maintains, in at least one embodiment, an authenticated connection link between the device and the host, thereby allowing the passing of commands and data between the two data processing systems during the synchronization process. In addition, as shown in FIG. 10, the device link software components 107 also provide for, in at least certain embodiments, the connection to be used for additional applications to transfer other information back and forth between the device and the host including, but not limited to, a backup application or a configuration application and diagnostic tools. Further details with respect to the device link 107 are provided below in connection with FIGS. 10, 11, and 12. In at least certain embodiments, at least a portion of the device link software stack may reside on both the device and the host memory. In preferred embodiments, a portion of the device link software stack resides and executes on both the device and the host.

The device link software component 107 provides for a communication link between the sync agent 109 executing on the device 101 and the sync client 111 executing on the host 103. The device link 107 passes software based messages, such as calls and responses to calls, between software components as well as the structured data prepared in a format for synchronization in at least certain embodiments. The sync client 111 operates, at least in part, to maintain an authenticated connection between the host and device in at least certain embodiments. Moreover, the sync client, in one embodiment, may send device and host anchors as described herein, and may cause the saving of next device and next host anchors in response to a successful synchronization for a particular data class as described further herein. In one embodiment, the sync client will determine the synchronization mode as described further below and will also invoke the correct data class handler for a particular data class to manage the handling of data during the synchronization session for that data class, such as determining the entity types which are to be synchronized for that data class, transforming records to and from the device, determining the order to pull changes from the sync server (sync services) based on entity type, and to perform filtering on records pulled from the sync server (sync services). The sync client 111 is coupled to a data class handler for each data class which is supported by the host. In the example shown in FIG. 4, there is a data class handler for the calendar data class 135, and a data class handler for a contacts data class 137, as well as data class handlers for one or more other data classes 139. Each of these data class handlers is dedicated to providing synchronization services during a synchronization process for a particular data class. For example, when synchronizing calendar data, the data class handler will format calendar data obtained from a calendar data store 143A so that such data may be transmitted to the device for storage on the calendar store 119. Similarly, the data class handler may format data received from the device so that it may be stored in a database on the host. For example, the data class handler may perform, in at least certain embodiments, reformatting operations on data received from the device 101. In at least certain embodiments, the data class handlers for each data class may perform one or more functions for that particular data class. For example, the data class handler may cause the retrieval and storage of structured data from the store for that data class. Furthermore, the data class handler may format data for the device, and may filter structured data when synchronizing data. This filtering may be based upon a group, such as a personal group or business group for a contacts data store or may be based on size, such as for a notes data store as described further below. Moreover, a data class handler may send its version identifier to its corresponding data source for a particular data type on the device and may receive an identifier of the version of the data source for that particular data class. Moreover, a data class handler may create a new filter based on new records sent to the device or received from the device or perform operations with respect to modifying filters, such as a filter based on group or size or other parameters, as a result of the synchronization process, and SyncClient will save the modified filters. Moreover, SyncClient may cause the saving of remapped identifiers obtained from the device for records on the device as described herein. It will be understood that a data class handler for a particular class will typically be executing at the same time as a data source of the same class on the device. These two software components, together with a sync agent on the device and the sync client on the host, form active agents on both data processing systems which are active in executing software components as part of the synchronization process. In one embodiment, the data class handlers may not directly cause the storage and retrieval of structured data from data stores on the host. They transmit messages to the sync client 111 which in turn requests the sync services 141 which may in turn directly or indirectly cause retrieval and storage from the calendar stored database 143A or the contacts stored database 145A or other stored databases 147A. In another embodiment, Sync Client drives the saving and retrieval process, and gets data from sync services, and calls out to functions in the Data Class handler. The Sync Client asks the data class handler what entity types to synchronize with sync services. When it gets records it asks the data class handler to transform them for the device (note that the data class handler might return the same record untransformed in many cases). The Sync Client wires the Data Class Handler directly to the Sync Server (sync services) for purposes of filtering, so that the sync server directly asks the DataClassHandler whether or not to filter a record, and then the Sync Client asks the Data Class Handler (both after it has finished pushing records from the device and after it has pulled records from sync services for the device). The Data Class Handler is "responsive;" it responds to requests from the Sync Client (and in the case of filtering, the Sync Server), and it is the Sync Client that is the active agency responsible for controlling the sync operation on the host side.

The host may also include user application programs, such as a calendar application program 143, a contacts application program 145, and other application programs 147 which are used by a user to access and edit corresponding data classes having structured data stored in a corresponding stored database, such as a calendar stored database 143A. The architecture shown in FIG. 4 shows the data stores on the host side as being coupled directly to the application program; it will be appreciated that there is typically a file management system on a host data processing system which manages each database and which receives calls or other requests from software components such as the application programs 143 or 145 or other components, such as data class handlers or the sync services 141 in order to affect reading and writing of data to a particular stored database.

The following tables set out the functions of each of the following software components shown in FIG. 4: (1) a data source component; (2) sync agent component; (3) sync client component; and (4) data class handler component.

TABLE A

Data Source

Open data source (database or files used to house data)
Provide version, determine if can sync if Sync Client
(Data Class handler) version is smaller
Manage Computer (host) and Device Sync Anchors on device side,
determine if can fast or slow sync
Coordinate with applications using data from data source
Clear all data if being reset
Send changed/new/deleted records to Sync Client
Coordinate with application(s) for its data class to keep track of
which records have changed since last synchronization (Change History)
Process and Commit data from Sync Client side
Remap record identifiers for new records from Sync Client side

TABLE B

Sync Agent

Manage connection from the device to the Sync Client on computer side
Manage control flow/state machine for synchronization operation
on device side
Interface to DeviceLink for connection layer on device (which also
does the authentication and cryptography)
Set up the correct Data Source for a given Data Class
Provide process infrastructure for synchronization
Launch on demand so Sync Client can connect to device to synchronize
Cleanly handle connection loss or cancel request from Computer (host)
side
Handle cancel notification on device side (i.e. from a user interface
on the device) to stop synchronizing at user request

TABLE C

Sync Client

Manage connection to Sync Server (sync services) on computer (host),
and Sync Agent on device
Manage control flow/state machine for synchronization operation
on computer (host) side
Manage Computer and Device Sync Anchors on computer (host) side
Interface to DeviceLink for connection layer on computer (host)
(which also does the authentication and cryptography)
Set up the correct Data Class Handler and load filtering information
for a given Data Class
Interface to Sync Server (sync services) —manage sync type (fast, slow,
reset) and synchronization operation with Sync Server (sync services)
Get changes from Sync Server (sync services) to send to Device
Tell Sync Server about remapped record identifiers from Sync Client
(Data Source)
Cleanly handle connection loss or cancel request from device side
Handle cancel notification on computer (host) side (i.e. from a user
interface on the computer (host)) to stop synchronizing at user request

TABLE D

Data Class Handler

Provide version, determine if can synchronize if Sync Agent (Data
Source) version is smaller (older)
Specify which data types to synchronize
Provide Filtering on all records
Specify which order to pull different record types from Sync Server TABLE D-continued Data Class Handler (sync services) (to make device side processing of added/changed records more efficient)
Transform records (e.g. from one format to another format) pulled from Sync Services on computer (Sync Server) to be sent to the device (to optimize transfer
and work for device)
Transform records (e.g. from one format to another format) from device (Sync Agent/Data Source) to be pushed into SyncServices
(to optimize transfer and work for device)

FIG. 5 shows a flow chart indicating various actions and operations which occur on the host and the device over time during a typical synchronization process according to at least one embodiment. The vertical line down the center separates the host operations and actions from the device's operations and actions and also represents the progress of time during a synchronization operation. The host 177 may begin the synchronization by connecting to the device and authenticating with the device in operation 179. This may be a two-way authentication using self-signed certificates and a self-assigned certificate authority from the host. An example of a collection of certificates which may be used in connection with a two-way authentication is shown in FIG. 12. This authentication may be encrypted with public key/private key cryptography so that the security level is relatively high. This will allow a mobile handheld device to be securely authenticated through a WiFi wireless connection or a Bluetooth wireless connection without risk of the device being exposed to other hosts, thereby revealing potentially private and/or confidential data on the device or its host. In response to the connection operation 179, the device 175 responds with a ready signal 181. Then in operation 183, the host indicates that it wants to begin a synchronization operation for data class A (or the next data class) as shown in operation 183. Typically, synchronization is performed for one data class at a time by one data source and one data class handler on the device and the host, respectively, at least in those embodiments which use the software architecture of FIG. 4. In response to the signal in operation 183, the device responds with an acknowledgement in operation 185 indicating that it is capable of performing a synchronization operation on data class A because it has the necessary software components, such as a data source for the data class A. If the device does not have the necessary software components to perform the synchronization, it will indicate that synchronization cannot proceed. In this manner, at least in certain embodiments, the device and the host perform automatic checking, without user intervention, for the support to synchronize one or more data classes. This automatic checking of support for each data class may be performed separately for all data classes or selected data classes on both the device and the host. In at least certain embodiments, the device and/or host may decide, based on dynamic conditions and states, not to synchronize a data class at a particular time. For example, if an application which uses a database having data in the data class is actively using the database, then the device and/or host may not synchronize that data class in the current synchronization process. In response to the acknowledgement from operation 185 of the device, the host in operation 187, sends its version number for the particular data class handler for data class A. In response, the device, in operation 189, sends its version number for its data source for data class A. In this way, each of the device and the host receive both version numbers and can perform a comparison to determine which software component to use to decide whether and how to synchronize the structured data in data class A. Typically, the higher version number indicates the later version of the software component. Typically, it is preferred to use the later software component to decide whether and how to synchronize for a particular data class. In alternative embodiments, it may be possible to use the earlier software component. The advantage of using the later software component is that it has knowledge of prior formats, generally, and hence will understand how to deal with prior formats as well as supporting newer formats. In at least one embodiment, if the data source is a later version than the data class handler, then the device will decide how to handle the synchronization if it can be performed. On the other hand, in at least certain embodiments, if the data class handler on the host is the later version of the software component in this comparison, then the host may decide how to perform the synchronization for the particular data class. Further information in connection with this comparison of version numbers is provided in conjunction with a discussion of FIGS. 8A and 8B below.

After operation 189, the host, in operation 191, sends a next host anchor and the previous device anchor to the device. The device, in operation 193, sends its next device anchor and the previous host anchor. These anchors are used, as is known in the art, to attempt to make the synchronization operations essentially atomic transactions such that a synchronization is either completed or not and each of the host and the device can recognize that a prior synchronization is incomplete and hence the data was rolled back to its prior state without making changes which would have occurred if a particular synchronization session had been completed. In each of operations 191 and 193, the host and the device respectively may also transmit to the other system a synchronization type, which indicates a particular type of synchronization which the sending system thinks it needs to perform in the current synchronization operation. There are typically at least three different types of synchronization operations: (1) a complete synchronization, which typically occurs the first time that a host and a device are synchronized; (2) a changes synchronization, which merely synchronizes the changes that occurred since the last synchronization; and (3) a reset operation in which data on one or more system is reset to a default or factory setting, which typically means all user data is erased or removed from the system which has been reset. The type of synchronization requested by each device is considered in a synchronization type negotiation. Typically, both systems will send the same synchronization type (e.g. a changes type), but in some instances, one system may request a complete or slow synchronization while another will request a changes (fast) synchronization, and in such instance, in at least one embodiment, the two systems will negotiate to select the "worst" synchronization operation in the sense of time. Since the complete synchronization takes longer than a changes synchronization, in most cases, the complete synchronization (a "slow" synchronization) will be selected over a fast synchronization (a "changes" synchronization). The negotiation of the type of synchronization is performed with knowledge of the status of the anchors. As is known in the art, a comparison of the anchors will reveal whether the prior synchronization was completed or not. If it was interrupted, then the previous host anchor from the device will not match the host's version of its previous host anchor. Similarly, if the prior synchronization was interrupted or otherwise incomplete, the previous device anchor from the host will not match the previous device anchor at the device when the comparison is performed at the device. The fact that there is a mismatch reveals a problem with the prior synchronization which will cause either the host or the device to request a complete (slow) synchronization type. An anchor may be a value which is used by one or both systems in a synchronization process to determine the state of synchronization of the systems. Typically, the fact that anchors match indicates that the last synchronization was successfully completed.

After the synchronization type has been negotiated, then in operation 195 a synchronization begins by the host requesting either the changes if it is a fast sync or all records if it is a full or complete sync. Then in operation 197, the device sends the changes, or all records depending on the type of synchronization, to the host. The host acknowledges in 199 the transmission transactions resulting from operation 197. These acknowledgements may be performed at one or more levels, including at a packet level or a record level, etc. A final acknowledgement from the host will cause the device, in operation 201, to save its next device anchor at the device. As is known in the art, at the end of a successful synchronization, all "next" anchors, such as a next device anchor which has been saved, will become a previous device anchor for use in a future synchronization. In at least one embodiment, the sync agent maintains for each class the previous host anchor as well as the previous device anchor and will create the next device anchor for a particular data class during a synchronization operation. Similarly, in at least one embodiment, the sync client will maintain for each class a previous host anchor and a previous device anchor and may create the next host anchor for use in the processes shown in FIGS. 5, 6A, 6B, 7A, and 7B. The device may acknowledge after operation 201 that it has saved its next device anchor in operation 201 which will cause the host in operation 203 to save the next device anchor at the host and to commit to a data store the changes or all records for the particular data class. This may occur by having the data class handler for a particular class request sync services 141, or in other embodiments, a file system software component, to make changes to the database or store for the structured data of the particular data class being synchronized. Then in operation 205, the device indicates that it is ready to pull. This indicates to the host that the device is ready to accept either changes or all records depending on the synchronization type which was negotiated. In response, the host in operation 207 sends changes or all records, depending on the synchronization type, and the device acknowledges (operation 211) these data transmissions from operation 207 at one or more levels of granularity as indicated above. Then, in one embodiment, in operation 211, the device sends a map which indicates the relationship between identifiers (ID) for each record maintained at the host relative to a corresponding ID maintained at the device for the same record; in an alternative embodiment, the device may indicate the map information when it acknowledges the records received from the host computer rather than as a separate message in the protocol. It will be appreciated that in alternative implementations, the same identifier may be used, but at least in certain embodiments, it may be desirable to have a distinct and separate ID maintained by the device for each record which may be different than an ID maintained for that same record on the host. Hence, a map or a relationship between the corresponding IDs may be maintained. In this case, the map is created by the device and transmitted to the host. In response to receiving the record ID map, the host provisionally stores the map indicating the relationships between a device ID for a record and the host ID for the same record. After all records have been sent to the device, and acknowledged from the device (and the record mappings have been provisionally stored on the host), the host transmits a commit request to the device in operation 213 which will cause the device to save either the changes or all records, depending on the synchronization type, from the current synchronization session to its data store for the current data class. Also, in operation 215, the device will save the next host anchor. Then in operation 217, the device responds with an acknowledgement signal which will cause the host in operation 219 to commit the pulled records and to save the next host anchor. The committing of pulled records also commits the provisionally stored map indicating the relationship between a device ID for a record and the host ID for the same record.

The method shown in FIG. 5 is repeated for each data class which is to be synchronized. When all data classes have been synchronized, then the host and the device can disconnect.

It will be appreciated that the method shown in FIG. 5 may be implemented differently in alternative embodiments; for example, certain operations may be omitted and the order of those operations may be different. For example, the transmission of the version numbers may be omitted or the transmission of the ID map may be omitted. Furthermore, in an alternative embodiment, the order of operations may be altered such that the device pulls changes or all records from the host first before sending its changes or all records to the host. Furthermore, the connection may be initiated by the device rather than the host and the device may perform certain operations that the host performs in the method shown in FIG. 5.

FIGS. 6A and 6B show a flow chart which illustrates one embodiment of the operations performed by software components on a host, such as the sync client software component as well as a data class handler for a particular data class being synchronized in a synchronization session. The discussion of FIGS. 6A, 6B, 7A, and 7B will assume that the software architecture shown in FIG. 4 is used in the particular embodiment being described for these methods. It will be appreciated that alternative software architectures may also be used with these methods. Operation 251 of FIG. 6A involves determining whether or not the device and the host have been connected by the device link set of software components, such as the device link 107. This connection determination may be performed by the sync client 111. Then in operation 253, it is determined whether there are any further data classes that still require synchronization for a current synchronization session. If none are left, then the device and the host may be disconnected. Then in operation 255, it is determined whether the device can synchronize the particular data class. This is similar to the automatic checking of support for a particular data class that was described in connection with operation 185 of FIG. 5. If the device cannot synchronize a particular data class, then synchronization for that data class is canceled, reverting back to operation 253. Synchronization for a data class may not be supported if the device does not include a particular data source to support synchronization of the data class. Also, synchronization for the data class might be refused by the device if the data source cannot obtain resources that it needs to synchronize that data class (e.g. as described herein, the application using the data in the data class may refuse to yield to requests to synchronize the data class). If it is supported, then in operation 257, the sync client obtains the version number of the data source for the current data class being synchronized. This version number is compared to the version number of the data class handler on the host to determine whether they match or are otherwise compatible. This version checking has been described elsewhere and is further illustrated in FIGS. 8A and 8B. If the versions do not match and are not otherwise compatible, then a user interface in operation 261 may be presented to the user to indicate the need or desirability to update or upgrade one or more software components in order to allow synchronization to be performed. If the versions match or are otherwise compatible, then in operation 263, the anchors and synchronization type are obtained from the device. This in at least one embodiment results in operation 193 shown in FIG. 5. Then in operation 265, the synchronization operation is started, and in operation 267, the synchronization mode (e.g. one of complete, or changes only, or reset) is negotiated. If reset mode is negotiated in operation 267, then this is detected in operation 269 which causes processing to branch to operation 273 which tells the device to clear all records. If reset mode has not been selected, then the processing selects between either fast synchronization mode as determined in operation 271 or full/complete synchronization mode, resulting in operation 275.

In operation 277, the host asks the device for changes in the current data set if the synchronization is a fast synchronization. The records are processed in operation 279 at the host and one or more acknowledgement may be sent to the device. The processing of the records in operation 279 may be performed by the data class handler for the current data class, and this processing may include "mutation" of records and other changes to put the structured data into the proper format for storage in the data store for the current data class. Then, in one embodiment in operation 281, the host saves the next device anchor, and in operation 283 it asks sync services, such as the sync services component 141, to prepare to pull, which involves transmitting changes or all records to the device as the second part of synchronization from the host's side. The form of synchronization is determined in operation 285. If it is a fast synchronization, then operation 289 follows. In one embodiment, if it is a slow (complete) synchronization (e.g. a reset synchronization), then operation 287 follows. One or more acknowledgments are received from the device; the host may also receive with these acknowledgments from the device a record ID map which shows the relationship between the device ID for a record and the corresponding host ID for that record. This ID map is saved at the host by the data class handler for the current data class. Then in operation 293, the host sends a message to the device asking whether it can commit to the changes. If not, then synchronization is canceled, leaving the device anchors as they were previously, which indicates an incomplete synchronization when the next synchronization process begins. If the device can confirm commitment, it will do so in operation 295, which includes receiving a message from the device that it can commit to the changes or all records. At this point, in operation 297, the host commits the pulled records by saving the ID map it received from the device and saving the next host anchor. In one embodiment, saving of the ID map (recording remapping) is performed only if the commit succeeds and the host commits the pulled records and saves the next host anchor. Then the host proceeds to the next data class by reverting back to operation 253 in FIG. 6A. It will be appreciated that in alternative embodiments, some of the operations may be omitted or additional operations may be performed and the sequence of operations may be changed relative to that shown in FIGS. 6A and 6B.

Figure 7B:
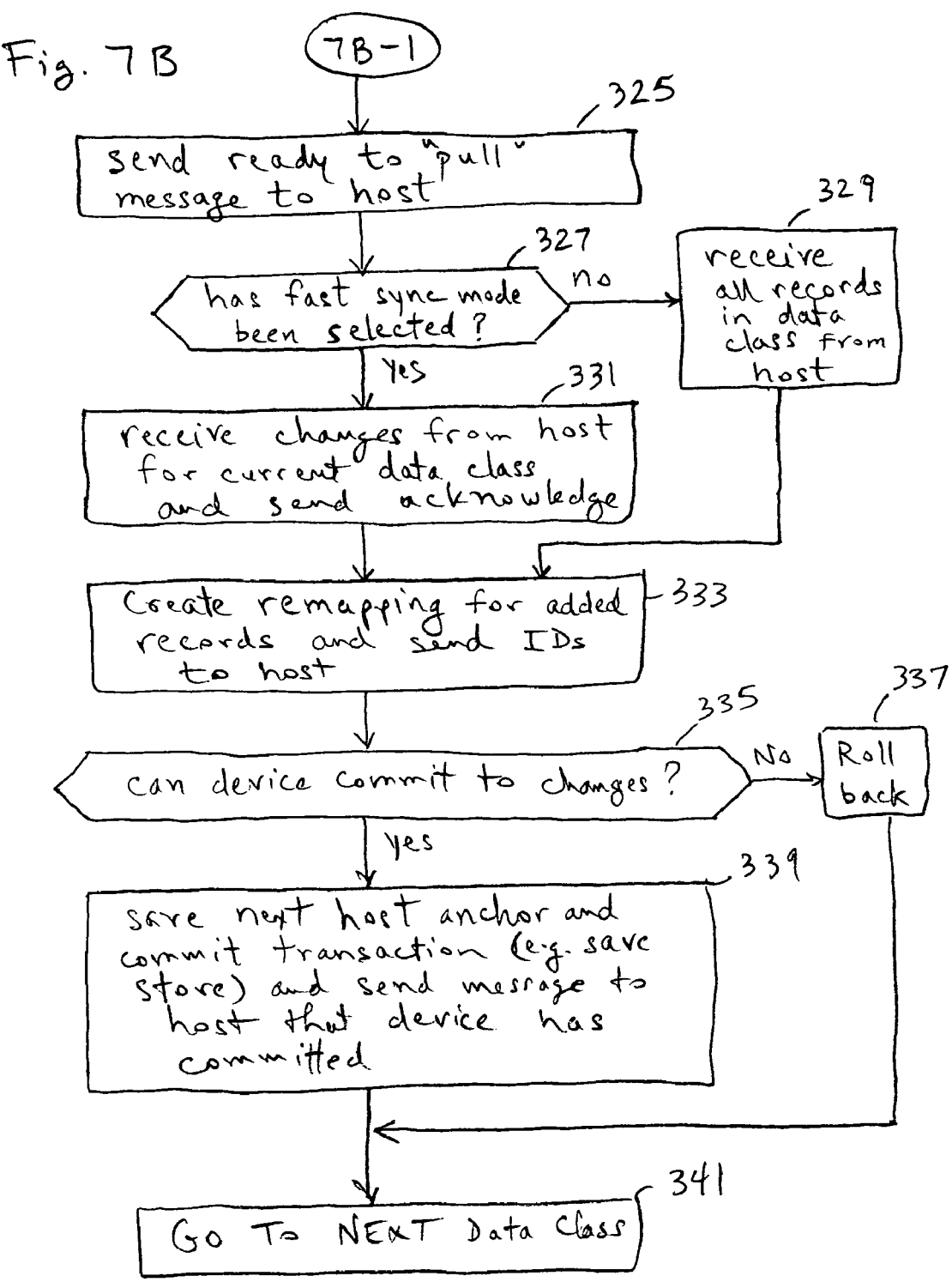

FIGS. 7A and 7B illustrate a method which may be performed by a device in at least certain embodiments to perform synchronization at the device. This synchronization may employ the software architecture shown in FIG. 4 and may also follow the method shown in FIG. 5 for the device portion of FIG. 5. In operation 301, the device waits for a connection which may be a wired connection or a wireless connection. Once it is connected in operation 303, it tells the host that the device is ready for synchronization. This operation 303 may be performed by the sync agent software component of FIG. 4. Then in operation 305, the device waits for a request to synchronize data in a particular data class or disconnect. If in operation 307 it is found that it does not have a data source for a particular data class, then synchronization for that data class will not be performed and operation 307 reverts back to operation 305 for the next data class. Operation 307 represents one way in which the device supports automatic checking of support for a particular data class as described elsewhere in this disclosure. If a data source for the data class is found, then a negotiation of version occurs in operation 309. This negotiation of the version may occur between the data source on the device and the data class handler on the host as described elsewhere and as shown in FIGS. 8A and 8B. After the version has been negotiated in operation 309, the device obtains anchors from the host and based on those anchors, as described herein, determines the synchronization mode (e.g. fuluslow, fast/changes only, or reset). The operations after operation 311 select one of the modes and process the data accordingly. If reset mode has been selected, then in operation 315 all records are marked as cleared. It will be understood that in at least certain embodiments, the data is not cleared immediately or deleted immediately but rather is marked to be cleared. If fast synchronization is determined to have been selected in operation 317, then processing proceeds to operation 321 in which changes are sent for the current data class from the device to the host. If slow synchronization has been selected, then processing proceeds from operation 317 to operation 319 in which all records are sent from the device. After sending all records or sending changes only from the device or marking the records to be cleared, operation 323 saves the next device anchor at the device and clears history at the device. Clear history refers to the change history managed, in at least one embodiment, by the application on the device and the Data Source. As changes are made by the user in an application (e.g. Contacts or Calendar application), the application notes these changes in a Change History which can be consulted by the Sync Agent's Data Source if it can do a "fast sync". The Data Source gets the change history (list of changes since last synchronization) so it knows what records were changed (and can only send over the changed records instead of all records—in a "fast sync"), and after the synchronization (or when doing a reset or slow sync) it clears the change history (the list of changes), so the application can then start building a new list of changes for the next synchronization. Note that there may be a history cursor used to coordinate between the application and the data source, so the data source will only clear history up to the point it used during the synchronization, and the application can add new entries to the history after that, but those history entries after the point used during synchronization will not erroneously be cleared by the Data Source after synchronization. Change History may be maintained by Contacts, Calendars, and Notes applications in at least one embodiment. Processing proceeds from operation 323 to operation 325 in which the device sends a message that it is ready to pull data from the host. The synchronization mode is determined in operation 327. If a slow/full synchronization is to be performed, then all records in operation 329 are received from the host. On the other hand, if a fast synchronization is to be performed, then changes from the host are received for the current data class and the device sends back one or more acknowledgments to the host confirming receipt of the data. One or more acknowledgements may also be transmitted from the device to the host for the records received in operation 329. Then in operation 333, the device creates a remapping for added records and sends device identifiers for those records to the host. This remapping is typically performed by the data source for the current data class and is transmitted to the data class handler on the host for the current data class, which causes the saving of the mapping between host IDs for a particular record and device IDs for the same record. Then in operation 335, the sync client on the host asks the sync agent on the device whether the device can commit to the changes. If not, the data source causes a rollback to the prior version of the structured data by not saving the changes from the current synchronization session and, after operation 337, processing proceeds to the next data class, which in one embodiment may mean that processing returns back to operation 305. If the device can commit to the changes, then operation 339 is performed in which the device saves the next host anchor and commits the transaction by saving the changes or all records to its store for the current data class and sends a message to the host that the device has committed.

FIGS. 8A and 8B will now be referred to in connection with embodiments which utilize version identifiers for the data source and the data host handler in determining whether and how to synchronize for a particular data class the structured data on both the host and the device. After a sync agent on a device and a sync client on a host have begun synchronizing, as in operation 401, the method of FIG. 8A determines whether there is another data class that needs to be synchronized and identifies that data class. As noted elsewhere, either the sync agent or the sync client may be responsible for selecting the order of synchronization among the various data classes. If there are no data classes left to synchronize, then the synchronization session is ended and the device and host are disconnected for purposes of synchronization in operation 405. If there are additional data classes to be synchronized, then processing proceeds to operation 407 in which the next data class begins synchronization by initializing the data class handler on the host for the selected data class and sends that data class handler version number for the current data class to the device. Alternatively, the data source on the device may send its version number to the host. In operation 409, the data source initializes itself on the device and compares its version number on the device to the data class handler version number on the host. Then in operation 411, based on the comparison of the version numbers, it is decided how and whether to synchronize and whether or not an alert needs to be presented to the user to update or upgrade one or more data source software components or data class handler components on the user's device and/or host. In the method of FIG. 8A, it is assumed that one system or the other system makes a decision in operation 411 based upon the set of version identifiers which is either on the device or the host but not both. FIG. 8B represents an alternative implementation in which both systems have both version numbers and can perform the comparison and arrive at the same decision. If a decision was made to synchronize in operation 411, then in operation 413 the synchronizing is performed for the current data class, and FIGS. 5, 6A, 6B, 7A, and 7B provide examples of how synchronization can be performed for a current data class. After synchronization is completed, other operations are performed, such as saving anchors for the current data class in operation 415, and the process of FIG. 8A reverts back to operation 403 which has been described previously. It will be appreciated that alternative embodiments of FIG. 8A may involve fewer operations or more operations and may alter the sequence of those operations in a manner which is different than that shown in FIG. 8A.

FIG. 8B shows an embodiment which utilizes version identifiers for each data source software component on a device and for each data class handler software component on the host. In this embodiment, both the host and the device will receive both version numbers and perform the comparison and then decide how and whether to synchronize for the current data class. After the sync agent on the device and the sync client on the host have begun synchronizing in operation 425, it is determined in operation 427 whether there are any data classes that need to be synchronized and to select the next data class for synchronization. One or both of the sync agent and the sync client may perform this function in operation 427. If there are no further data classes to synchronize, then, in operation 429, synchronization is ended and the device and host may be disconnected under software control. If there is a next data class to synchronize, then, in operation 431, the data class handler for the current data class on the host is initialized and it causes its version number to be sent to the device. A data source software component for the same current data class on the device is also initialized and its version number is sent to the host. The host and the device each compare the two version numbers and decide, based upon the higher version number, how and whether to synchronize for the current data class. If it is decided to not synchronize for the current data class, one or both systems may display or otherwise present an alert to the user suggesting the user to update and/or upgrade a software component or several software components on at least one of their device and the host. In this case, synchronization for the current data class will not occur and processing reverts back to operation 427. If, on the other hand, the higher version number software component decides that it is compatible with a lower version number software component on the other system, then synchronization can be performed. Also, if the version numbers match, then synchronization can also be performed. In operation 435, synchronization is performed and then in operation 437 synchronization is completed by, for example, saving anchors and processing other data for the current data class and then processing reverts back to operation 427. In some embodiments, the system (host or device) with the higher version may use the version information from the other system in order to take any action necessary to synchronize data to and from the system with the old version. For example, the "old system" might use a different name for some properties, and the system with the higher version can know this and translate the name back and forth. The older system might represent some properties differently, and if they can be translated back and forth the system with the higher version can do that translation coming and going.

Another aspect of at least certain embodiments described herein relates to a manner in which a software layer for creating and maintaining a data connection for one or more services may be used for each of those services and may provide an interface to one or more stream handlers which implement transport protocols to send structured data, files and other data through a physical interface, such as a wired USB interface or a Bluetooth wireless interface or other wireless interfaces, such as a WiFi interface or a wireless cellular telephone interface. The same layer may also provide for encrypted authentication, and this authentication may be a two-way authentication which establishes an authenticated connection throughout the transmission back and forth between a device and a host through the device link connection layer. The software architecture shown in FIG. 4 shows a device link 107 which may be implemented in the manner shown in FIG. 10 which illustrates a software architecture in which layers of software interface with each other through messages or calls at the interface between the software layers. The software architecture 450 is shown as having four layers which include a device link connection layer 457, a stream handler layer 459, and stream libraries layer 465 as well as an upper layer for one or more applications or services, such as a backup application or service or a configuration application or service or synchronization services provided by the sync client software component and the sync agent software component described herein. The sync client and sync agent software components 454 provide the synchronization functions and operations described with respect to FIGS. 4-8B. The application software component 452 may be a backup application which backs up data, including data which has not been synchronized, or alternatively a configuration application or one or more other types of applications which need to make a connection in a secure and authenticated manner through the device link connection layer 457. The stream handler layer 459 includes one or more stream handlers. In the particular embodiment shown in FIG. 10, there is a USB stream handler 461 and a Bluetooth stream handler 462 and a TCP stream handler 463. These different stream handlers implement the communication protocols and handle the stream over the different interface represented by USB or Bluetooth or TCP (which may be a WiFi or other wireless interface which utilizes TCP/IP). The stream library layer 465 is called upon by the stream handler to transmit and receive data through the particular protocol represented by the stream handler. For example, the USB stream handler may make calls to a particular group of stream libraries in order to transmit data over a USB interface. Similarly, the Bluetooth stream handler 462 may make calls to one or more libraries in the libraries layer 465 in order to transmit and receive data through a wireless Bluetooth interface. The device link connection layer 457 provides a unified interface to all the stream handlers in the stream handlers layer 459 by making calls to the appropriate stream handler based upon the currently used physical interface to connect the device to the host. The device link connection layer 457 includes both connection functionality and authentication and/or encryption functionality represented by the sublayers 456 and 458, respectively. The sublayer 456 is responsible for selecting the particular physical interface and establishing a connection through the interface by authenticating, as described below, the host to the device and the device to the host, and at the same time by invoking a particular stream handler for the selected interface which in turn invokes the appropriate stream libraries to create packets or other data structures for transmission over the physical interface. The device link connection layer 457 may be responsive to either a user input to synchronize or back up or configure a device, or may be responsive to an automatic discovery of the device through a technology such as Bonjour from Apple Computer, Inc. For example, docking a device in a dock which is coupled to the host may cause Bonjour to recognize that a device has been docked to a host and that the user may desire to synchronize the device. This may cause a display of a user interface asking the user if the device should be synchronized, or alternatively, the device may be automatically synchronized as a result of placing it in the dock. This will then cause the sync agent and sync client to begin a synchronization process as described herein and to also make calls to the device link connection layer in order to transmit data between the host and the device. Calls made by the sync client or the sync agent in the process of synchronization (or calls made by an application such as a backup application 452) result in the device link connection layer 457 making software based calls or sending other types of messages to the stream handlers layer 459, which in turn call particular libraries in the stream libraries layer 465. With an architecture such as that shown in FIG. 10, the synchronization software components, such as the sync client and the sync agent components, are isolated from the stream handlers. Thus, a sync agent software component and a sync client software component do not need to implement such handlers. Further, the device connection layer provides a uniform interface which authenticates the device to the host across three different physical interfaces and many different stream handlers; this isolates the synchronization software components as well as the other application components from the authentication software. Hence, a developer of a synchronization client or a synchronization agent or a data source for a data class or a data class handler for a data class do not need to recreate code (e.g. software program) to implement stream handlers or to implement authentication or encryption or to implement software to create the connection between a device and a host. Furthermore, by integrating the authentication and the encryption layer with the device connection layer, all services which use the device connection layer, such as the synchronization services or the application services 452 (e.g. backup applications, configure applications, diagnostic applications, etc.), obtain the benefit of automatic, two-way authentication, in at least certain embodiments, as a result of making calls to the device link connection layer 457 which in turn causes authentication and/or encryption to any one of the possible physical interfaces and their corresponding stream handlers. The use of the authentication and encryption layer 458 at a layer of abstraction between the transport and the protocol (stream handler) layers makes the architecture useable by more than just synchronization.

In one embodiment, the architecture shown in FIG. 10 provides a number of useful features. DeviceLink 457 may handle all authentication and encryption automatically for the application (the application may merely have to indicate where to find the certificates used by the security code). Further, the DeviceLink connection authenticates both the device and the host. DeviceLink 457 may provide asynchronous behavior for all stream handlers (transports) doing I/O between the device and host, so the transport just has to read/write synchronously, and DeviceLink 457 manages the thread control to make it appear as asynchronous to the application, so the application never blocks reading and writing— the application (such as Sync Client on the host or Sync Agent on the device) is notified of incoming data (and other related things, such as connection/disconnection) via callbacks. DeviceLink 457 does all the authorization at the top of the stream (transport) layer, so all transport types which may be plugged in get authentication and encryption without needing to implement anything special. In one embodiment, Device Link 457 may have file transfer facilities built directly into DeviceLink's protocol. This may be used for backup, and other tools (and can be used in future applications based on device link 457). The protocol of DeviceLink 457 may include a function to do efficient transfer of a file in pieces, so that a file does not have to be read completely in memory at one time. Further, DeviceLink 457 may provide Unix style "stat" information (by itself, or with the file), such as the size of the file and the last modified date, so the applications can keep track of the file's state to tell if it needs to copy it or not (this may be useful for incremental backups). Once connected via DeviceLink 457, an application can use the protocol to request information about a file, and to request the file itself. The file is sent in chunks to avoid reading a huge file into memory all at once (on both sides). DeviceLink 457 may provide some default behavior when the file is requested to just get the file and send it (so the application doesn't need to respond to the callback for the request and take explicit action), although the application can respond if it wants to do custom handling (and use its own code if it wants). Similarly, when receiving pieces of a file, a default callback handles simply writing the file to disk, but that may be overridden in some embodiments. DeviceLink 457 may provide a "white list" of which files (or directories) can be requested, and which files or directories can be written into, so the two sides can control access. Other file copying solutions on the device may also exist independently of DeviceLink 457; for example, a media player (e.g. iTunes) may provide file copying facilities; however, DeviceLink 457 provides considerable infrastructure (authentication, asynchronous interface, part of the existing DeviceLink protocol for ease of use by an application), and has more functionality then a simple file copy API (it has the white lists, and default handling which can be overridden, and chunks the files).

An example of a sequence of operations which involve the use of device link connection layer 457 will now be provided. In one embodiment, a synchronization initiator (for example, either Sync Agent 109 on the device or Sync Client 111 on the host) will be launched (e.g. by the user or by the system, such as by a Bonjour discovery process). The initiator will then try to connect to the other side. The initiator, through DeviceLink connection layer 457, will establish a basic (unauthenticated) connection, which causes the launching of the other application (e.g. if Sync Client 111 initiates the process then basic connection may cause the launching of Sync Agent 109 on the device; conversely, if Sync Agent 109 initiates the process then basic connection may cause the launching of Sync Client 109 on the host). At this point, the DeviceLink connection layer 457 attempts to perform a two-way authentication process, described further herein; if that process succeeds, then an authenticated connection between the host and the device has been created and the synchronization initiator gets a callback from the DeviceLink connection layer 457 that the connection was made and the connectee application (that was launched by the basic connection) gets a notification that an incoming connection was made; for example, if authentication is successful and if Sync Client 111 was the initiator, then Sync Client 111 will receive the callback and Sync Agent 109 is the connectee application. If authentication fails, the initiator receives a connection failed callback and there is no connection, and the connectee will normally exit after some time interval.

FIG. 11 illustrates an alternative example of the operations of a device link connection layer 457. In operation 501, a connection is established. This may be performed by discovering the device. For example, Bonjour may be used to discover the device, either when connected through a wireless connection or a wired connection to the host. The device link connection layer may then decide which interface to use, and there may be a priority associated with each of those interfaces based upon speed, security, and convenience. For example, USB may be the highest priority connection interface followed by WiFi and finally Bluetooth, in at least certain embodiments. After an interface has been selected, then in operation 503 the device link connection layer performs authentication between the host and the device. In at least certain embodiments, this authentication is two-way, meaning that each of the device and the host perform authentication operations with certificates created upon initialization. FIG. 12 shows an example of the collection of certificates that the device and host may have after initialization of both in a manner described herein. In certain embodiments, authentication may be optional. After authentication is performed, then in operation 505 the device connection layer or other software may cause the launching of a sync client and sync agent in order to begin synchronization. While synchronization is occurring, the device link connection layer maintains the connection, which may be maintained as an authenticated connection, during the synchronization process of structured data in operation 507. In alternative embodiments, the method of FIG. 11 may be used with non-synchronization services, such as the backup application or configure application 452. In this case, the connection may be maintained, and it may be an authenticated connection during those services. After synchronization or other services are complete, the device link connection layer may disconnect the device from the host in software, even though the device may still be in the dock of the host. In other words, the software connection is torn down as a result of ending the synchronization process or other process which invoked the device link connection layer 457.

FIG. 12 shows an example of data structures maintained at both a device and a host after performing an initialization of an authentication system which provides two-way authentication between the device and the host. The authentication is encrypted with public key/private key cryptography, thereby providing a high level of security to allow a device to be synchronized to a host through a wireless interface while maintaining sufficient security so that the user can be assured that other hosts will not be able to obtain access to data on either the device being synchronized or the host. Moreover, this two-way authentication may be used for file transfers between the device and the host and for other services (e.g. diagnostic services) which utilize the authenticated connection. In order to provide adequate security, the device may be required to be connected by a wired interface initially and the user may be asked, by the display of the device, to enter a value, such as a large number or other character string, into the host. Alternatively, the value may be displayed on the display of the host and the user may be required to enter that value or character string into the device. Following this operation, the device may create a private and public key pair and save its private key. The host may perform a similar operation to create a private key of the host and a corresponding public key of the host. The host may also create a certificate for a self-created certificate authority and may further create a public key/private key pair for the certificate authority. Each of the device and the host may include an identifier which may be a unique identifier for each system, and each of these identifiers may be transmitted to the other side (device ID transmitted to host and host ID transmitted to device) and this identifier is mapped to the saved private key of a particular system. In the example shown in FIG. 12, the saved private key of the device 529 for its host is mapped to the host's ID which is provided by the host. Similarly, the device's ID 535 for that device is mapped to the private key of the host 531. The host may create a certificate and sign it with a certificate authority using the host's public key, optionally with additional information. The host may also create a device certificate and sign it with the certificate authority certificate and then may transmit these certificates (537, 541, and 545) to the device. These certificates can be used in known techniques, such as a secure socket layer handshake, to provide transport layer security and to provide a two-way authentication between the device and the host. This authentication may be maintained during the entire connection, which may include a synchronization operation and other operations utilizing this authenticated connection. In one embodiment, as shown in FIG. 12, the device has a mapping between a host identifier and the following: Device private key used for that host, device certificate used for that host, host certificate, host certificate authority certificate (used in the self-signed authentication). Similarly, the host has a mapping from a device ID to the following: Host private key used for the device, host certificate used for that device, device certificate, host certificate authority certificate used with that device. The device has a separate device private key for any host it communicates with (the private key maps to the device certificate used with that host, and the device has one device certificate per host), and there is a similar arrangement on the host side, as there is a separate private key host certificate pair per device.

FIGS. 13A and 13B relate to an aspect of at least certain embodiments described herein. This aspect involves the ability for one or both of the device and the host to have both non-synchronization processes and synchronization processes occurring concurrently in that they are both being executed by one or more processing systems. Both sets of processes or threads may be in different address spaces. This allows a user of a device to operate the device while it is being synchronized, and similarly allows a user of the host to operate the host while the host is synchronizing with the device. For example, if both the device and the host have these capabilities, then a user on the device may be viewing a calendar program which displays a calendar of the user showing events and possibly To Do items for the user while at the same time a synchronization service is synchronizing the calendar data on the device with calendar data on the host. This synchronization may be implemented using the software architecture shown in FIG. 4 and may further use the methods shown in FIGS. 5-7B. Similarly, the user may use an application program on the host to access and edit the calendar data or other structured data for other applications while at the same time the host is performing synchronization operations on structured data in one or more stores of structured data. The synchronization process may be implemented on the host using the architecture shown in FIG. 4 and using the methods shown in FIGS. 5-7B, which have been described above.

The non-synchronization threads or processes may be user-level or non-user-level threads or processes which are not synchronization tasks. The synchronization threads or processes are synchronization tasks performed by one or more synchronization software components such as Sync Agent 109 or Sync Client 111 or other synchronization software components. The concurrent execution of the non-synchronization threads or processes and the synchronization threads or processes may occur on one or both of the device and the host. Operation 575 in FIG. 13A shows that non-synchronization threads or processes may be performed on both the device and the host. In operation 577, execution of synchronization software begins on, in this embodiment, both the device and the host while execution of non-synchronization threads or processes continues on both the device and the host. In operation 579, a synchronization software component, such as the Sync Agent 109, attempts to acquire a lock on a store for a data class which is to be synchronized. Sync Agent 109 in one embodiment may do this by invoking the Unix FLOCK call to lock the file containing, for example, the bookmarks to be synchronized. Also in one embodiment, if a synchronization software component accesses an SQlite database, if may not need to acquire a lock as the database may handle this function itself. In one embodiment, Contacts, Calendars and Notes may be stored in databases which handle their own locking at a lower level. Also in one embodiment, Sync Client may not attempt to acquire any locks. If the lock is acquired, as determined in operation 580, then synchronizing is begun in operation 591. On the other hand, if the lock is not acquired then the synchronization component, in operation 581, may notify the application using the data class that the synchronization component requests the lock and the synchronization component waits for a response. The application may receive a response indicating the lock is acquired, in which case processing proceeds to operation 591; otherwise, if the lock is not acquired after the notification, the processing proceeds to operation 583 in which synchronizing of the current data class is canceled and operation 579 follows if further data classes need to be synchronized (otherwise the process ends). If, while synchronizing is being performed, the user attempts to change the store for the data class being synchronized, the system (e.g. either the device or the host) may present, in operation 593, an alert to the user that the system cannot accept changes until synchronizing is completed. After synchronization for the current data class is completed, in operation 595, the lock is released and processing proceeds to the next data class, if one still remains to be synchronized, or synchronization is finished.

It will be appreciated that in alternative embodiments, only one of the host and the device may support concurrent operation of non-synchronization processes and synchronization processes.

Another aspect of at least certain embodiments described herein relate to methods and systems for synchronizing bookmarks or favorites on one or both of the device and the host when synchronizing structured data. The bookmarks of various web browsers on each of the device and the host may be collected together and stored in an intermediate or canonical topology which is used to synchronize the bookmarks and collections of bookmarks on at least two web browsers, one being on the device and one being on the host. In certain embodiments, there may be multiple web browsers operating or used by a user on the host and one web browser used on the device. The intermediate topology collects the various bookmarks from the different web browsers, aggregates those into the canonical topology, and then uses that topology to synchronize the bookmark structures for each of the web browsers on such a system. In addition, the synchronizing may also include converting between one format (e.g. a URL data type to another format (e.g. a string representing the URL) for each of the one or more bookmarks in each web browser.

The synchronization of bookmarks on different browsers may require a mechanism to convert or otherwise deal with the difference in the format of the hierarchy of bookmarks. For example, different web browsers have different data structures for maintaining a hierarchy of a collection of bookmarks. Each of these data structures may be considered a topology. FIGS. 14A, 14B, 14C, and 14D provide examples of those different topologies. The example shown in FIG. 14A may be the topology of the web browser known as Safari from Apple Computer, Inc. of Cupertino, while the topology shown in FIG. 14B may be the topology of Internet Explorer from Microsoft Corporation, and the topology shown in FIG. 14C may be the topology of Firefox, and the topology shown in FIG. 14D may be the topology of a web browser on a device, such as a handheld computer with wireless cellular telephone capabilities or other wireless interfaces, such as WiFi, which may be used to access the Internet and browse the Internet. The topologies shown in FIGS. 14A, 14B, 14C, and 14D represent the topology prior to synchronization among the web browsers. The topology 625 includes a bookmarks menu 627 and a bookmarks bar 629 as well as one or more folders 631 which may be arranged in a hierarchy including folders 632 and 633. The topology 637 in FIG. 14B does not include a bookmarks menu but does include a bookmarks bar 638. Another difference between the topology 637 and the topology 625 is the existence of bookmarks at a top level in the topology, such as the bookmarks 639 and 640. In the topology 625, there is no support for bookmarks at the top level; in other words, the bookmarks must be within a folder or in the bookmarks menu or in the bookmarks bar. In contrast, the topology of 637 supports bookmarks at the top level, such as the bookmarks 639 and 640. The topology 637 also includes a collection of one or more folders which may be arranged in a hierarchy, such as folders 641 and folders 642 and 643. The topology 651 is similar to the topology 625 except that bookmarks at the top level, such as bookmarks 639 and 654, may be included in the topology 651 but they are not included or allowed in the topology 625. The topology 651 includes a bookmarks menu 652, a bookmarks bar 653, bookmarks at the top level, such as bookmarks 639 and 654, and a collection of folders containing bookmarks, such as folders 656 and 657 and 658.

FIGS. 15A, 15B, 15C, and 15D show how the bookmark topologies appear after a synchronization between the collections of bookmarks for the different web browsers. The designation "A" as been added to each reference numeral to indicate that it is the same element except after synchronization. For example, the bookmarks menu 627A is the same as the bookmarks menu 627 except that it may include additional bookmarks as a result of the synchronization operation. It can be seen that synchronization has caused the addition of a top level folder 675 which may contain top level bookmarks from other topologies, such as the bookmarks 639 and 640 and 654. Hence, the synchronization process has added another folder to the structure 625A to accommodate bookmarks for top level bookmarks in other web browsers. Similarly, the topology 637A has now included, after synchronization, a bookmarks menu 676 which incorporates the bookmarks found in the bookmarks menu 627 and 652 from the other two web browsers. The bookmarks data structure shown in FIG. 15D has been modified to include a top level folder 677 in order to accommodate bookmarks at the top level from other web browsers. Hence, in the example shown in FIGS. 15A, 15B, 15C, and 15D, a synchronization process among multiple web browsers has resulted in the addition of bookmarks and folders and other data structures to the different topologies in order to synchronize the bookmarks among the different web browsers. This synchronization was able to occur even though the topologies for the bookmark structures of the different web browsers are different. The synchronizing which occurred is a form of synchronization which does not delete a bookmark in one web browser if it is not present in another. This synchronization may be implemented through an intermediate topology, such as a canonical topology. An example of such a topology is shown in FIG. 16A along with a topology for a host's web browser bookmark structure and a device's web browser bookmark structure. A mapping relationship is also shown between the canonical topology and each of the other two topologies 637A and 665A. A mapping relationship is shown by a line with an arrow at each end. For example, bookmarks in the bookmark bar 638A are mapped to bookmarks in the bookmark bar 692 in the canonical topology. Similarly, top level bookmarks 639 and 640 are mapped to the top level folder 693 in the canonical topology. Similarly, folders and bookmarks within those folders 641A are mapped to folders 694 in the canonical topology 690. Bookmarks in the bookmark menu 691 of the canonical topology are mapped to other bookmarks 669A. This mapping relationship allows conversion during synchronization from one set of bookmarks on a device or a host to another set of bookmarks in another web browser on the device or the host.

FIGS. 16B and 16C illustrate two methods for synchronizing bookmarks. Operation 701 of FIG. 16B maps at least one bookmark from at least one web browser on a host to at least one of an intermediate topology or a device topology for bookmarks. For example, the top level bookmarks 639 and 640 may be mapped to the intermediate topology 690 or directly mapped to the device topology 665A. In operation 703, at least one bookmark from at least one web browser on the device is mapped to at least one of an intermediate topology or the host's topology for bookmarks. An example of this mapping may be the mapping which occurs in bookmarks added to the top level folder in the topology 665A, which in turn are mapped to the top level bookmarks in the topology 637A. The mapping, in operation 701 and 703, may be implemented by a table or other data structure which shows the association between the different topologies such that synchronization may be performed in operation 705. In that operation, bookmarks are synchronized on a device with bookmarks on the host. As noted in operation 705, the device's bookmark topology may be different from the host's topology, and different than the intermediate topology as is shown in FIG. 16A.

The method of FIG. 16C assumes that an intermediate topology is used and that there is a mapping between each of the web browsers and the intermediate topology. It will be understood that at least in certain embodiments, the host or the device may maintain a complete data structure of all bookmarks in the intermediate topology which can then be used to update the bookmark structure of each web browser. In operation 715, first bookmarks in a first topology for a first web browser on a host are mapped to an intermediate topology which may be maintained on the host or the device. In operation 717, second bookmarks in a second topology for a second web browser on the host are also mapped into the intermediate topology. Then in operation 719, the first bookmarks and the second bookmarks on the host are synchronized with third bookmarks on a device which is coupled to the host during the synchronizing period. In this particular method, two different web browsers having two different topologies on the host are synchronized with a web browser on the device. In at least certain embodiments, the device's topology for its web browser may be different than the first topology and different than the second topology and the intermediate topology.

In an embodiment, the system may perform this synchronization automatically without user interaction and without requesting any input from a user. While this may reduce the complexity required to configure such a system, it may be desirable to present one or more user interfaces which allow a user to set preference settings or other settings which indicate how the synchronization of bookmarks is to be performed among two or more web browsers. The user interface 725 shown in FIG. 16D allows a user to select one option from three possible options by selecting one of the three check boxes 727, 729, and 731. The check mark shown in the check box 727 indicates that a user has selected the first option which synchronizes the device's bookmarks to the host's bookmarks and the host's bookmarks to the device's bookmarks; this is considered a two-way synchronization. The other two options are one-way only synchronizations. In particular, if the user had selected check box 729, then synchronization would be performed only to synchronize from the device's bookmarks to the host's bookmarks. If the user had selected check box 731, then synchronization would be performed from the host's bookmarks to the device's bookmarks only.

FIG. 16E illustrates another user interface which allows a user to select all web browsers for synchronization or only selected ones of the web browsers. If the user selects the check box 737, then synchronization is performed for all web browsers on both the device and the host. The interface 735 shows that the user has selected the second option by selecting the check box 739. In this case, the system will synchronize bookmarks with bookmarks of selected web browsers on the host, and the user has selected buttons 742 and 743 but has not selected buttons 741 and 744. Hence, bookmarks maintained by Firefox and bookmarks maintained by Safari on the host will be synchronized with bookmarks on the device as a result of these selections in the user interface 735. The selection of the button 744 will cause an application browser window to appear to display applications on the host to allow the user to pick selected applications from the list to include in the set of web browsers to be synchronized on the host.

The user interface 750 shown in FIG. 16F allows the user to limit synchronization to selected folders. This option has not been selected as can be seen by the absence of a check mark in the check box 751. If the user does select check box 751, then one or more browser windows may be caused to appear to allow a user to browse through windows containing lists of various bookmarks and bookmark folders, and bookmark bars on a system. It will be appreciated that each of these user interfaces may be used individually or in combination to allow a user to control how bookmarks are synchronized in at least certain embodiments described herein.

FIG. 17 relates to another aspect of at least certain embodiments described herein. This aspect relates to the synchronization of setup information for one or more electronic message system accounts, such as an email account or an instant messaging account. This synchronization may be performed in a one-way direction from the host to the device rather than in both directions. Moreover, in at least certain embodiments, modifications made to an account setup information on the host may not be reflected on a previously set up account which has been established and is existing on the device.

The flow chart of FIG. 17 provides one example of how account information may be synchronized. FIG. 18 shows a memory structure of the device and a memory structure of the host with respect to email account setup information. The method of FIG. 17 may begin in operation 781 in which a data processing system receives setup information for an email account (or for other types of electronic message systems). This information is received on the device and may be for an account "A." The setup information 791 may be an example, in FIG. 18, of such setup information. In operation 783, the host may receive information to set up an email account which may be account "B" and is shown as setup information 795 in FIG. 18. Synchronization may occur after establishing a connection between the device and the host as in operation 785. During the synchronization operation 787, account B, which was established on the host, may be synchronized as a new account on the device. The synchronization may be a one-way synchronization in at least one embodiment; this is represented by the arrow 790 shown in FIG. 18. In this case, the email account which was set up on the device is not synchronized back to the host. In this embodiment, the device ends up having a superset of the email accounts. This may be desirable in cases where the user prefers greater privacy on the device than the host, for example.

It will be appreciated that in alternative embodiments, the direction of synchronization may be reversed such that it is from the device to the host and not from the host to the device. In this case, any account set up on the device will be synchronized and established on the host, but not vice versa.

FIGS. 19, 20, and 21 relate to another aspect of at least certain embodiments described herein. This aspect relates to how notes may be synchronized. In at least certain embodiments, a note, which is typically a text freeform document, may contain other information, such as image data, audio data, movie data, and even To Do items. The To Do items may be embedded within the note and may be created as part of creating the note. When the note is synchronized, the To Do item is also synchronized in a separate To Do database in at least certain embodiments. Further information in connection with notes having embedded To Do items may be found in co-pending U.S. patent application Ser. No. 11/499,009, filed on Aug. 4, 2006, and entitled "Methods and Systems for Managing To Do Items or Notes or Electronic Messages;" this application is hereby incorporated herein by reference.

FIG. 19 shows one exemplary method for synchronizing a note which contains one or more embedded To Do's on either a host or a device. The note itself may be treated as one data class, while the To Do item will be treated as, in at least certain embodiments, another data class. If the architecture of FIG. 4 is utilized, then a portion of the note is synchronized for the data source and the data class handler for the note store while another portion of the note is synchronized with another data store and another data class handler for the To Do data class. In an alternative embodiment, the note with an embedded To Do may be synchronized to merely one database or store rather than two through the use of only one pair of a data store and a data class handler. In operation 811, the note with an embedded To Do is stored on a host or a device. This will cause the updating of a To Do database on the host (or the device) in operation 813. When synchronization occurs in operation 815, the note database on the device is synchronized and the To Do database on the device is also synchronized. If the note was stored on the device in operation 811, then the note database on the host is synchronized and the To Do database on the host is synchronized in operation 815. In this manner, different parts of the note are synchronized to two different data stores.

FIG. 20 provides an example of how an embedded note may be created. In operation 825, a system, such as a device or a host, receives content of the note. This content may be a freeform text document but may also include image data, such as a picture or other graphics. Then in operation 827, the system receives a selection of a command to create a To Do item from at least a portion of the content of the note. This selection may occur, in certain embodiments, before receiving the content. Then in operation 829, a To Do item is added to a To Do database. This new To Do item may optionally be presented to the user in a To Do window or other user interface item.

FIG. 21 shows an example of how a note or other type of structured data may be synchronized or not depending on a filter. In the case of a note, the filter may be the size of the note to prevent the systems from attempting to synchronize a very large note which contains either a lot of text or image data. In operation 841, a connection is established to synchronize notes on a device to notes on a host. In operation 843, it is determined if a synchronization filter for notes has been set, either by the system, such as a default, or by the user. As synchronization is performed, operation 845 is also performed for each note which is to be synchronized between the host and the device. This operation involves determining whether or not the note satisfies the filter. In one embodiment, the filter may be a maximum size of the note. If the note exceeds the maximum size, then it will not be synchronized or only text portions will be synchronized. This is shown in operation 849. If the note does satisfy the filter, then it is synchronized as shown in operation 847. This is repeated for each note which is to be synchronized. In another embodiment, rather than not synchronizing larger notes at all, a method may synchronize text and/or other small portions of such larger notes and include an indicator or marker in the synchronized copy (which has been reduced in size by the removal of the image or other data) that a portion of the original note (e.g. the image data portion) has not been included in the synchronized copy. In this way, synchronization of at least a portion of larger notes can still be performed while filtering out, in the synchronization process itself, the larger parts of the note.

Another aspect of at least certain embodiments relate to transformations of data as part of the synchronization process between the host and the device. Examples of these transformations include: converting data types such as a URL to a text string (e.g., in synchronizing bookmarks) or converting date formats for calendar events or converting contact images, etc. In each case, the device and the host may use a different format; for example, the device may use a first date format for calendar events and the host may use a second date format for calendar events. In one embodiment, the Data Class Handler for a data class on the host may perform the transformations for that data class for both the host and the device as noted in Table D. In other embodiments, the Data Source on the device for a data class and the Data Class Handler on the host for that data class may share the tasks of transforming between formats for that data class.

Further information will now be provided with respect to transformation of image formats. For example, the device may support contact images (e.g. for a contacts or address book application on the device) having a richer (e.g. more varied) format than contact images (for contacts or address book application on the host) on the host. Further, the device may store previously clipped versions of an image and previously scaled versions of images for a contact so it can display them quickly.

On the host, there may be just one small image for a contact's picture. This image can be fairly large if set via API (Application Program Interface) from another application, but if created in a contacts or address application on a host, it may be small, and if it is created from an original image that is larger, that original image is lost. In contrast, on the device, in one embodiment, the original image which was used to create a contact image may be maintained in its entirety. For example, a user can pick images from a photo or camera application and apply them as a contact's image—these can be any size, so the user may choose the visible area of the image to use, and that visible area is, if necessary, scaled (e.g. scaled down) so it fits on the screen. The device may store a clip rectangle which the user chooses (though some user interface) to choose the portion of that image to be displayed. The device may also store clipped and scaled images for a rectangular-sized and square-sized image. The rectangular image may be the size of the screen, and may be shown on an incoming call. The square image may be shown scaled down even smaller as part of the contact, and used in situations where there is only some of the screen (a square area) which is available to display the image. In one embodiment, when the user chooses the clip rectangle, the user interface shows how the rectangular and square images will look. If the user wants to regenerate what the device displays, the user will, in this embodiment, still have the original image, so the user can go back to the original image and choose another clip rectangle, and regenerate the saved images in rectangular and square sizes and shapes.

Synchronization of contacts/address book, at least in one embodiment, includes synchronizing the images in the contacts/address book and this includes synchronizing the clip rectangle as well as the original image. The synchronizing process may also have to regenerate the optimized images in certain cases, such as if the user changes the image in their Address Book on the host, or if the user gets an image from a device and synchronizes it to another device (e.g., the user gets an image from a device with one sized screen and wants to synchronize it to a device with a differently sized screen). The Data Class Handler may, in one embodiment, clip/scale new/changed images when synchronizing them onto the device because that may be faster than having the device do it (and the device may also be memory constrained. Because there might be more than one device synchronizing the same contact images, and those devices could have different sized displays, in one embodiment, separate clip rectangles are saved for each unique device display size, so an image can be clipped differently on one device with a different size than another device. The Data Class Handler in one embodiment manages keeping track of the different rectangles (since each device will only know about the one rectangle that matches its screen size). For example, if a device has 320×480 screen, and a contact image is originally 1024×800, the synchronization process stores optimized images for the entire screen (320× 480) and a square 320×320 representation as well. The user can pick the clip rectangle out of the original image which is then scaled down to 320×480 (and the device cuts out a 320×320 part), and this is synchronized to the host. If the image changes on the host, the synchronization process (through the Data Class Handler, for example) recomputes the 320×480 and 320×320 images for the device. If a new image is synchronized to a device with a different size, if the original image is still large enough to cover the screen, the synchronization process, in one embodiment, will find the center of the image in the clip area for one of the existing clip rectangles (for the other size device screen), and expand/contract the clip rectangle accordingly to fit the different size (e.g. larger size) screen. If the new device has a smaller screen, the synchronizing process may merely scale the image down to that size.

Another aspect of at least certain embodiments relate to frameworks and architecture for synchronizing widgets. Generally, widgets are user interface elements that include information and one or more tools that let the user perform tasks and/or provide access to information. Widgets can perform a variety of tasks, including, for example, communicating with a remote server or other source of data to provide information to a user (e.g., weather report; stock prices; sunrise/sunset times; current phase of the moon; current exchange rates; etc.), providing commonly needed functionality (e.g., a calculator; a calendar; a clock; etc.), or acting as an information repository (e.g., a notebook). Widgets can be displayed and accessed through an environment referred to as a "unified interest layer," "dashboard layer," "dashboard environment," or "dashboard." Widgets and dashboards are described in co-pending U.S. patent application Ser. No. 10/877,968, entitled "Unified Interest Layer for User Interface," filed on Jun. 25, 2004, which patent application is incorporated herein by reference in its entirety.

Widgets on a device may be synchronized, using any one of the embodiments described herein, with widgets on a host or another device. The synchronization may be one-way (from device to host or another device only or from host or another device to device only) or two-way. In the case of two-way synchronizations, both systems will normally end up with a common set of widgets, assuming both systems can support the full, common set of widgets.

Widgets may be treated, at least in certain embodiments, as another data class and may be synchronized using the architecture shown in FIG. 4 and described throughout this disclosure. In one embodiment, a Data Source for widgets may exist on a device and a Data Class Handler for widgets may exist on a host. The executable software which implements the widget may not be synchronized but the configuration settings for the widget may be synchronized between a device and a host or between a device and another device. Each widget on a system may have configuration settings and these settings may be stored as one file for a particular type of widget. For example, a weather widget may have settings which specify three cities (e.g. San Francisco, Los Angeles, and Washington, D.C.) and those settings are stored as one file or record for purposes of synchronization.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine implemented method performed on a device having a processor and a memory, the method comprising:
storing in the memory a first mapping relationship and a second mapping relationship, the first mapping relationship between a first topology of bookmarks of a first web browser on a host and an intermediate topology of bookmarks, wherein the intermediate topology shows an association of bookmarks between different topologies, the first topology including an arrangement of different bookmarks specified by the first web browser, wherein the first topology includes at least two of a) bookmark folders; (b) a bookmark bar; (c) a bookmark menu; and (d) bookmarks at a top level, wherein the first mapping relationship is associated with mapping the first bookmarks of the first web browser in the first topology to second bookmarks in the intermediate topology, and the second mapping relationship between a device topology of bookmarks of a second web browser on a device and the intermediate topology, wherein the second mapping relationship is associated with mapping third bookmarks of the second web browser in the device topology to the second bookmarks in the intermediate topology, wherein the device topology of bookmarks of the second web browser includes an arrangement of different bookmarks, specified by the second web browser wherein the device topology includes at least two of a) bookmark folders; (b) a bookmark bar; (c) a bookmark menu; and (d) bookmarks at a top level, wherein the first topology, the device topology and the intermediate topology are different from each other, wherein the first web browser and the second web browser are different from each other;
and
synchronizing using the intermediate topology, the first mapping relationship and the second mapping relationship, by receiving at the device bookmarks on the host and transmitting from the device bookmarks on the device to the host.

2. The method as in claim 1 wherein the intermediate topology is a canonical topology and wherein the synchronizing comprises adding bookmarks, to bookmarks of the first web browser or the second web browser.

3. The method of claim 2 wherein the first web browser is configured to be one of at least three different web browsers and wherein a bookmark comprises at least one of a URL (Uniform Resource Locator) and an address of a resource, and wherein the device is a handheld data processing system and the host is a data processing system.

4. The method as in claim 3 further comprising:
presenting a user interface to allow a user to modify one or both of the mapping relationships.

5. The method as in claim 3 wherein the synchronizing occurs a plurality of times.

6. A non-transitory or non-transmissible computer readable storage medium storing executable program instructions which when executed cause a data processing system to perform operations comprising:
storing in a memory a first mapping relationship and a second mapping relationship, the first mapping relationship between a first topology of bookmarks of a first web browser on a host and an intermediate topology of bookmarks, wherein the intermediate topology shows an association of bookmarks between different topologies, the first topology including an arrangement of different bookmarks specified by the first web browser, wherein the first topology includes at least two of a) bookmark folders; (b) a bookmark bar; (c) a bookmark menu; and (d) bookmarks at a top level, wherein the first mapping relationship is associated with mapping the first bookmarks of the first web browser in the first topology to second bookmarks in the intermediate topology, and the second mapping relationship between a device topology of bookmarks of a second web browser on a device and the intermediate topology, wherein the second mapping relationship is associated with mapping third bookmarks of the second web browser in the device topology to the second bookmarks in the intermediate topology, wherein the device topology of bookmarks includes an arrangement of different bookmarks, specified by the second web browser wherein the device topology includes at least two of a) bookmark folders; (b) a bookmark bar; (c) a bookmark menu; and (d) bookmarks at a top level, wherein the first topology, the device topology and the intermediate topology are different from each other, wherein the first web browser and the second web browser are different from each other; and
synchronizing using the intermediate topology, the first mapping relationship and the second mapping relationship, by receiving at the device bookmarks on the host and transmitting from the device bookmarks on the device to the host.

7. The medium as in claim 6 wherein the intermediate topology is a canonical topology and wherein the synchronizing comprises adding bookmarks, to bookmarks of the first web browser or to bookmarks of the second web browser.

8. The medium of claim 7 wherein the first web browser is configured to be one of at least three different web browsers and wherein a bookmark comprises at least one of a URL (Uniform Resource Locator) and an address of a resource, and wherein the device is a handheld data processing system and the host is a data processing system.

9. The medium as in claim 8, the method further comprising:
presenting a user interface to allow a user to modify one or both of the mapping relationships.

10. The medium as in claim 8 wherein the synchronizing occurs a plurality of times.

11. A data processing system comprising:
a memory, and
means for storing in the memory a first mapping relationship and a second mapping relationship, the first mapping relationship between a first topology of bookmarks of a first web browser on a host and an intermediate topology of bookmarks, wherein the intermediate topology shows an association of bookmarks between different topologies, the first topology including an arrangement of different bookmarks specified by the first web browser, wherein the first topology includes at least two of a) bookmark folders; (b) a bookmark bar; (c) a bookmark menu; and (d) bookmarks at a top level, wherein the first mapping relationship is associated with mapping the first bookmarks of the first web browser in the first topology to second bookmarks in the intermediate topology, and the second mapping relationship between a device topology of bookmarks of a second web browser on a device and the intermediate topology, wherein the second mapping relationship is associated with mapping third bookmarks of the second web browser in the device topology to the second bookmarks in the intermediate topology, wherein the device topology of the bookmarks of the second web browser includes an arrangement of different bookmarks, specified by the second web browser wherein the device topology includes at least two of a) bookmark folders; (b) a bookmark bar; (c) a bookmark menu; and (d) bookmarks at a top level, wherein the first topology, the device topology and the intermediate topology are different from each other, wherein the first web browser and the second web browser are different from each other; and means for synchronizing, using the intermediate topology, the first mapping relationship and the second mapping relationship by receiving at the device bookmarks on the host and transmitting from the device bookmarks on the device to the host.

12. A machine implemented method performed on a host having a processor and a memory, the method comprising:

storing in the memory a first mapping relationship between a first topology of bookmarks of a first web browser on a host and an intermediate topology of bookmarks, wherein the intermediate topology shows an association of bookmarks between different topologies, wherein the first topology includes an arrangement of different bookmarks specified by the first web browser, wherein the first topology includes at least two of a) bookmark folders; (b) a bookmark bar; (c) a bookmark menu; and (d) bookmarks at a top level, wherein the first mapping relationship is associated with mapping the first bookmarks of the first web browser in the first topology to second bookmarks in the intermediate topology, and wherein the intermediate topology further allows a second mapping relationship between a device topology of bookmarks of a second web browser on a device and the intermediate topology, wherein the second mapping relationship is associated with mapping third bookmarks of the second web browser in the device topology to the second bookmarks in the intermediate topology, wherein the device topology of the bookmarks of the second web browser includes an arrangement of different bookmarks specified by the second web browser, wherein the device topology includes at least two of a) bookmark folders; (b) a bookmark bar; (c) a bookmark menu; and (d) bookmarks at a top level, wherein the first topology, the device topology and the intermediate topology are different from each other, wherein the first web browser and the second web browser are different from each other;

synchronizing using the intermediate topology, the first mapping relationship and the second mapping relationship, by receiving at the host bookmarks on the device and transmitting from the host bookmarks on the host to the device.

13. The method as in claim 12 wherein the intermediate topology is a canonical topology and wherein the synchronizing comprises adding bookmarks to bookmarks of the first web browser, or to bookmarks of the second web browser.

14. The method of claim 13 wherein the first web browser is configured to be one of at least three different web browsers and wherein a bookmark comprises at least one of a URL (Uniform Resource Locator) and an address of a resource, and wherein the device is a handheld data processing system and the host is a data processing system.

15. A non-transitory or non-transmissible computer readable storage medium storing executable program instructions which when executed cause a data processing system to perform operations comprising:

storing in a memory a first mapping relationship between a first topology of bookmarks of a first web browser on a host and an intermediate topology of bookmarks, wherein the intermediate topology shows an association of bookmarks between different topologies, wherein the first topology includes an arrangement of different bookmarks specified by the first web browser, wherein the first topology includes at least two of a) bookmark folders; (b) a bookmark bar; (c) a bookmark menu; and (d) bookmarks at a top level, wherein the first mapping relationship is associated with mapping first bookmarks of the first web browser in the first topology to second bookmarks in the intermediate topology, and wherein the intermediate topology further allows a second mapping relationship between a device topology of bookmarks of a second web browser on a device and the intermediate topology, wherein the second mapping relationship is associated with mapping third bookmarks of the second web browser in the device topology to the second bookmarks in the intermediate topology, wherein the device topology of the bookmarks of the second web browser includes an arrangement of different bookmarks specified by the second web browser wherein the device topology includes at least two of a) bookmark folders; (b) a bookmark bar; (c) a bookmark menu; and (d) bookmarks at a top level, wherein the first topology, the device topology and the intermediate topology are different from each other, wherein the first web browser and the second web browser are different from each other; and synchronizing using the intermediate topology, the first mapping relationship and the second mapping relationship, by receiving at the host bookmarks on the device and transmitting from the host bookmarks on the host to the device.

16. The medium as in claim 15 wherein the intermediate topology is a canonical topology and wherein the synchronizing comprises adding bookmarks to bookmarks of the first web browser or to bookmarks of the second web browser.

17. The medium of claim 16 wherein the first web browser is configured to be one of at least three different web browsers and wherein a bookmark comprises at least one of a URL (Uniform Resource Locator) and an address of a resource, and wherein the device is a handheld data processing system and the host is a data processing system.

18. A data processing system comprising:

a memory;

means for storing in the memory a first mapping relationship between a first topology of bookmarks of a first web browser on a host that includes at least two of a) bookmark folders; (b) a bookmark bar; (c) a bookmark menu; and (d) bookmarks at a top level, and an intermediate topology of the bookmarks, wherein the intermediate topology shows an association of bookmarks between different topologies, wherein the first mapping relationship is associated with mapping the first bookmarks of the first web browser in the first topology to second bookmarks in the intermediate topology, and a second mapping relationship between a device topology of bookmarks of a second web browser on a device and the intermediate topology, wherein the second mapping relationship is associated with mapping third bookmarks of the second web browser in the device topology to the second bookmarks in the intermediate topology, wherein the device topology of the bookmarks of the second web browser includes at least two of a) bookmark folders; (b) a bookmark bar; (c) a bookmark menu; and (d) bookmarks at a top level, wherein the first topology, the device topology and the intermediate topology are different from each other, wherein the first web browser and the second web browser are different from each other;

means for synchronizing using the intermediate topology, the first mapping relationship and the second mapping relationship, by receiving at the host bookmarks on the device and transmitting from the host bookmarks on the host to the device.

19. A machine implemented method comprising:

storing in a memory a first mapping relationship between a first topology of bookmarks of a first web browser on a device and an intermediate topology of bookmarks, wherein the intermediate topology shows an association of bookmarks between different topologies, wherein the first topology includes an arrangement of different bookmarks specified by the first web browser, wherein the first topology includes at least two of a) bookmark folders; (b) a bookmark bar; (c) a bookmark menu; and (d) bookmarks at a top level, wherein the first mapping relationship is associated with mapping the first bookmarks of the first web browser in the first topology to second bookmarks in the intermediate topology, and wherein the intermediate topology further allows a second mapping relationship between a host topology of bookmarks of a second web browser on a host and the intermediate topology, wherein the second mapping relationship is associated with mapping third bookmarks of the second web browser in the host topology to the second bookmarks in the intermediate topology, wherein the host topology of the bookmarks of the second web browser includes an arrangement of different bookmarks specified by the second web browser wherein the host topology includes at least two of a) bookmark folders; (b) a bookmark bar; (c) a bookmark menu; and (d) bookmarks at a top level, wherein the first topology, the host topology and the intermediate topology are different from each other, wherein the first web browser and the second web browser are different from each other;

synchronizing using the intermediate topology, the first mapping relationship and the second mapping relationship, by receiving at the device bookmarks on the host and transmitting from the device bookmarks on the device to the host.

20. The method as in claim 19 wherein the intermediate topology is a canonical topology and wherein the synchronizing comprises adding bookmarks to bookmarks of the first web browser or to bookmarks of the second web browser.

21. The method of claim 20 wherein the first web browser is configured to be one of at least three different web browsers and wherein a bookmark comprises at least one of a URL (Uniform Resource Locator) and an address of a resource, and wherein the device is a handheld data processing system and the host is a data processing system.

22. A non-transitory or non-transmissible computer readable storage medium storing executable program instructions which when executed cause a data processing system to perform operations comprising:

storing in a memory a first mapping relationship between a first topology of bookmarks of a first web browser on a device and an intermediate topology of bookmarks, wherein the intermediate topology shows an association of bookmarks between different topologies, wherein the first topology includes an arrangement of different bookmarks specified by the first web browser, wherein the first topology includes at least two of a) bookmark folders; (b) a bookmark bar; (c) a bookmark menu; and (d) bookmarks at a top level, wherein the first mapping relationship is associated with mapping the first bookmarks of the first web browser in the first topology to second bookmarks in the intermediate topology, and wherein the intermediate topology further allows a second mapping relationship between a host topology of bookmarks of a second web browser on a host and the intermediate topology, wherein the second mapping relationship is associated with mapping third bookmarks of the second web browser in the host topology to the second bookmarks in the intermediate topology, wherein the host topology of the bookmarks of the second web browser includes an arrangement of different bookmarks specified by the second web browser that includes at least two of a) bookmark folders; (b) a bookmark bar; (c) a bookmark menu; and (d) bookmarks at a top level, wherein the first topology, the host topology and the intermediate topology are different from each other, wherein the first web browser and the second web browser are different from each other;

synchronizing using the intermediate topology, the first mapping relationship and the second mapping relationship, by receiving at the device bookmarks on the host and transmitting from the device bookmarks on the device to the host.

23. The medium as in claim 22 wherein the intermediate topology is a canonical topology and wherein the synchronizing comprises adding bookmarks to bookmarks of the first web browser or to bookmarks of the second web browser.

24. The medium of claim 23 wherein the first web browser is configured to be one of at least three different web browsers and wherein a bookmark comprises at least one of a URL (Uniform Resource Locator) and an address of a resource, and wherein the device is a handheld data processing system and the host is a data processing system.

25. A data processing system comprising:

a memory;

means for storing in the memory a first mapping relationship between a first topology of bookmarks of a first web browser on a device and an intermediate topology of bookmarks, wherein the intermediate topology shows an association of bookmarks between different topologies, wherein the first topology includes an arrangement of different bookmarks specified by the first web browser, wherein the first topology includes at least two of a) bookmark folders; (b) a bookmark bar; (c) a bookmark menu; and (d) bookmarks at a top level, wherein the first mapping relationship is associated with mapping the first bookmarks of the first web browser in the first topology to second bookmarks in the intermediate topology, and wherein the intermediate topology further allows a second mapping relationship between a host topology of bookmarks of a second web browser on a host and the intermediate topology, wherein the second mapping relationship is associated with mapping third bookmarks of the second web browser in the host topology to the second bookmarks in the intermediate topology, wherein the host topology of the bookmarks of the second web browser includes an arrangement of different bookmarks specified by the second web browser that includes at least two of a) bookmark folders; (b) a bookmark bar; (c) a bookmark menu; and (d) bookmarks at a top level, wherein the first topology, the host topology and the intermediate topology are different from each other, wherein the first web browser and the second web browser are different from each other;

means for synchronizing using the intermediate topology, the first ma in relationship and the second mapping relationship, by receiving at the device bookmarks on the host and transmitting from the device bookmarks on the device to the host.

* * * * *

UNITED STATES PATENT AND TRADEMARK OFFICE
CERTIFICATE OF CORRECTION

PATENT NO. : 7,739,410 B2  Page 1 of 1
APPLICATION NO. : 11/650726
DATED : June 15, 2010
INVENTOR(S) : Gordon J. Freedman It is certified that error appears in the above-identified patent and that said Letters Patent is hereby corrected as shown below:

In column 2, lines 10-14, delete "Certain synchronization systems are described under the name "SyncML" and further information about these systems can be found at www.openmobilealliance.org and at www.openmobilealliance.org/tech/affiliates/syncml/syncmlindex.html." and insert the same on Col. 2, Line 9, after "host." as the continuation of the paragraph.

In column 18, line 17, delete "fuluslow," and insert -- full/slow, --, therefor.

In column 40, line 6, in Claim 25, after "first" delete "ma in" and insert -- mapping --, therefor.

Signed and Sealed this
Twenty-first Day of February, 2012

David J. Kappos
*Director of the United States Patent and Trademark Office*